(12) United States Patent
Miloushev et al.

(10) Patent No.: US 8,949,364 B2
(45) Date of Patent: Feb. 3, 2015

(54) APPARATUS, METHOD AND SYSTEM FOR RAPID DELIVERY OF DISTRIBUTED APPLICATIONS

(75) Inventors: Vladimir I. Miloushev, Dana Point, CA (US); Peter A. Nickolov, Laguna Niguel, CA (US)

(73) Assignee: CA, Inc., Islandia, NY (US)

(*) Notice: Subject to any disclaimer, the term of this patent is extended or adjusted under 35 U.S.C. 154(b) by 2014 days.

(21) Appl. No.: 11/522,050

(22) Filed: Sep. 15, 2006

(65) Prior Publication Data

US 2007/0078988 A1  Apr. 5, 2007

Related U.S. Application Data

(60) Provisional application No. 60/717,381, filed on Sep. 15, 2005.

(51) Int. Cl.
*G06F 15/167* (2006.01)
*G06F 9/50* (2006.01)
*G06F 9/48* (2006.01)
*H04L 29/08* (2006.01)

(52) U.S. Cl.
CPC ............ *G06F 9/5027* (2013.01); *H04L 67/1029* (2013.01); *G06F 9/485* (2013.01); *H04L 69/32* (2013.01); *H04L 67/1002* (2013.01); *H04L 67/1008* (2013.01); *H04L 67/10* (2013.01); *Y02B 60/142* (2013.01); *G06F 9/4856* (2013.01)
USPC .......................................................... 709/212

(58) Field of Classification Search
CPC .. G06F 9/4856; G06F 9/45533; G06F 3/0665
USPC .......................................................... 709/212
See application file for complete search history.

(56) References Cited

U.S. PATENT DOCUMENTS

| | | | |
|---|---|---|---|
| 6,496,871 B1 * | 12/2002 | Jagannathan et al. | 719/317 |
| 6,880,157 B1 | 4/2005 | Havemose | |
| 7,072,807 B2 | 7/2006 | Brown et al. | |
| 7,143,307 B1 | 11/2006 | Witte et al. | |
| 7,197,553 B2 * | 3/2007 | Roberts et al. | 709/223 |
| 7,360,034 B1 * | 4/2008 | Muhlestein et al. | 711/148 |
| 7,373,451 B2 | 5/2008 | Lam | |
| 7,383,288 B2 * | 6/2008 | Miloushev et al. | 1/1 |
| 7,669,020 B1 * | 2/2010 | Shah et al. | 711/162 |
| 7,725,559 B2 * | 5/2010 | Landis et al. | 709/215 |
| 2002/0035569 A1 * | 3/2002 | Clark et al. | 707/102 |
| 2002/0049749 A1 * | 4/2002 | Helgeson et al. | 707/3 |
| 2003/0115218 A1 * | 6/2003 | Bobbitt et al. | 707/200 |
| 2003/0187915 A1 * | 10/2003 | Sun et al. | 709/201 |
| 2004/0030822 A1 * | 2/2004 | Rajan et al. | 711/4 |
| 2004/0098717 A1 * | 5/2004 | Husain et al. | 718/100 |
| 2004/0153511 A1 | 8/2004 | Maynard et al. | |

(Continued)

OTHER PUBLICATIONS

IPER for PCT/US2006/036130 dated Mar. 17, 2009.

(Continued)

*Primary Examiner* — Krista M. Zele
(74) *Attorney, Agent, or Firm* — Baker Botts, L.L.P.

(57) ABSTRACT

An apparatus, method and system are disclosed for visually constructing and rapidly delivering distributed applications. The system includes a virtual appliance apparatus and a composite appliance apparatus, as well as a system for virtualizing hardware resources and for provisioning, executing and scaling distributed applications.

12 Claims, 26 Drawing Sheets

(56) References Cited

U.S. PATENT DOCUMENTS

| | | | | |
|---|---|---|---|---|
| 2004/0215749 | A1* | 10/2004 | Tsao | 709/220 |
| 2005/0091365 | A1* | 4/2005 | Lowell et al. | 709/224 |
| 2005/0125513 | A1* | 6/2005 | Sin-Ling Lam et al. | 709/220 |
| 2006/0143418 | A1* | 6/2006 | Takahashi et al. | 711/165 |
| 2006/0277380 | A1* | 12/2006 | Sicola | 711/165 |
| 2007/0038887 | A1* | 2/2007 | Witte et al. | 714/6 |
| 2007/0078988 | A1 | 4/2007 | Miloushev | |
| 2007/0162420 | A1 | 7/2007 | Ou et al. | |

OTHER PUBLICATIONS

Written Opinion for PCT/US2006/036130 dated Mar. 24 2008.

Grimshaw, Andrew et al., The Legion of Vision of a worldwide virtual computer. In Communications of the ACM archive, vol. 40, Issue 1 (1997); pp. 39, 45, 1997 (retrieved on Jul. 13, 2007) Retrieved from the internet: URL http://www.cs.umd.edu.class/spring2004/cmsc818s/Readings/legion-cacm.pdf.

International Search Report for PCT/US2009/036579 dated Oct. 28, 2009.

Miloushev et al., supplemental EP Search Report, EP Application No. 06814787, dated Dec. 23, 2009.

Chapin et al., "Resource Management Legion", Future Generations Computer Systems, Elsevier Science Publishers, Amsterdam, NL vol. 15, No. 5-6, Oct. 9, 1999.

Lewis et al., "Runtime support for automatic wide area implementation management in legion" Parallel and Distributed Processing Symposium. Proceedings 15th International San Francisco, CA, Apr. 2001, IEEE Comput. Soc. pp. 903-909.

Grimshaw et al., "Legion: Lessons Learned Building a Grid Operating System" Proceedings of the IEEE, New York, vol. 93, No. 3, Mar. 1, 2005.

Grimshaw et al., "Campus-wide Computing: Early Results Using Legion at the University of Virginia", International Journal of High Performance Computing Applications, Sage Science Press, Thousand Oaks, vol. 11, No. 2, Jun. 21, 1997.

Voss, "APPC/MVS Distributed Application Support", IBM Systems Journal, IBM Corp, Armonk, New York, vol. 31, No. 2, Jan. 1, 1992.

White et al., "Grid-based file access: 1-14 the Legion I/O Model" High-Performance Distributed Computing, 2000. Proceedings. The Ninth International Symposium on Aug. 1-4, 2000, pp. 165-173.

Paul Barham et al., "Xen and the Art of Virtualization", available from ACM 1-58113-757-5/03/0010.

Cristopher Clark et al., "Live Migration of Virtual Machines", presented at the $2^{nd}$ Symposium on Networked Systems Design and Implementation held in Boston, May 2-5, 2005.

Network Block Device, an open source project available hosted at http://nbd.sourceforge.net/.

* cited by examiner

```
component mysql
{
    # attributes
    .description    = "MySQL Server 5.0"
    .category       = Servers
    .migrateable    = 1
    .os_type        = linux volumes
    volume  boot    : dev = /dev/hda1, class, type = instantiable, ro
    volume  dbase   : dev = /dev/hda3
    volume  dblog   : dev = /dev/hda4 resources
    resource cpu    : min = 25% , max = 200%
    resource mem    : min = 256M, max = 4096M, abs = 128M
    resource bw     : min = 100M, max = 1000M terminals and interfaces
    input   in      : protocol = mysql properties
    property cache_sz         : type = string , dflt = 512       # cache sz, MB
    property base_dir         : type = string , dflt = /usr/data
    property ip_port          : type = integer, dflt = 3306
    property user             : type = string , dflt = mysql
    property max_connections  : type = integer, dflt = 500
    property flush            : type = integer, dflt = 1         # flush at commit
    property flush_time       : type = string , dflt = 5         # [seconds]

# config files
    cfgfiles
    [
        vol = boot , path = /etc/my.cnf
    ]
}
```

FIG. 7

```
assembly web_tier
{
  # boundary
  input    in
  output   app           : mandatory
  property cache_sz
  property timeout
  volume   content subordinates
  subordinate lbal : .class = global.lvs
  {
    .start_order = 20              # start after apaches
    service      = http            # service to load balance
    scheduler    = rr              # "rr" means round-robin
    timeout      = $.timeout       # connection timeout, sec
  } subordinate web1 : .class = myapache     # apache web server
  {
    .start_order = 10              # start apaches in a group
    content      = $.content       # redirected content volume
    cache_sz     = $.cache_sz      # external value
  } subordinate web2 : .class = myapache
  {
    .start_order = 10              # start apaches in a group
    content      = $.content       # redirected content volume
    cache_sz     = $.cache_sz      # external value
  } connections
  connections
  [
    $.in      -> lbal
    lbal.out1 -> web1
    lbal.out2 -> web2
    web1.app  -> $.app
    web2.app  -> $.app
  ]
}
```

FIG. 14

APPARATUS, METHOD AND SYSTEM FOR RAPID DELIVERY OF DISTRIBUTED APPLICATIONS

CROSS-REFERENCE TO RELATED APPLICATIONS

This application takes priority from U.S. Provisional Application Ser. No. 60/717,381 filed Sep. 15, 2005.

BACKGROUND OF THE INVENTION

1. Field of the Invention

The present invention generally relates to computer systems, and more particularly to an apparatus, a visual method and a system for rapid construction and delivery of distributed applications, such as web applications and web services.

2. Background Art

With a wide-spread adoption of the Internet and related forms of computer networking, the term "application" has come increasingly to mean combination of hardware and software integrated into a computing system that exposes a web-based interface to the network. FIG. 1 illustrates a computer network on which such applications operate.

The need to serve a large number of simultaneous users accessing the application from anywhere on the network requires modern applications to be scalable beyond the capacity of any single computer system. As a result, these applications are predominantly designed and implemented as distributed software systems deployed on clusters of commodity servers. FIG. 2 illustrates one possible topology of such cluster, while FIG. 3 illustrates a typical distributed application.

Distributed applications are by their nature more complex than traditional computer applications, which are designed to execute on a single machine and usually have a single memory space. A scalable distributed application that is capable of operating reliably 24 hours a day, 7 days a week, is a very complex computing system. Nevertheless, the explosion of complexity experienced today by enterprises that develop, deploy and operate distributed web applications and web services cannot be explained only by the inherent complexity of the functionality of these applications.

A big part of the complexity comes from the fact that the need to scale on-line applications caused a mass transition from traditional "big-box" enterprise servers, such as mainframes and SMP Unix servers, to commodity clusters in which different hardware and software components are delivered and supported by different vendors. The big-box enterprise servers were vertically integrated computing systems where the vendors spent billions of R&D dollars ensuring that all components and subsystems that go into the server interoperate well and no significant bottlenecks exist. Thus, integration of complex computing systems was and remains a key competency of every large server vendor.

When deploying applications on commodity clusters, the responsibility for integrating servers, networks, storage, operating systems, middleware, database engines, web servers, monitoring systems, management systems, backup systems, application-specific code and data, and all other moving parts that go into the finished system is now fully in the hands of the enterprise IT department. Moreover, unlike the big-box vendor, who was able to spread the costs and time spent on system integration over hundreds of nearly identical systems sold to different customers, with commodity clusters system integration has to be done over and over again, typically on each significant release of each application.

Over the years, there have been multiple attempts to develop an approach that reduces the complexity of such systems. These attempts can be classified into three broad categories: single system image (SSI) systems, distributed component systems and network-based systems.

The SSI systems attempt to rein in complexity by abstracting a distributed hardware system, such as a cluster, and presenting it to the application software as a single, large enterprise server with shared resources, in the hope that the benefits of a scalable commodity cluster can be combined with the simplicity of operating a big-box enterprise server. Naturally, there is no free lunch: both the operating systems and the applications designed for shared memory servers do not scale better than the SMP hardware—performance penalties become severe in systems with as few as 8 processors and only a rare application scales well to 64 processors, which is impressive by big-box standards but represents an entry level system for many, if not most, web applications.

The distributed component systems, such as CORBA, Microsoft .NET and DCOM, attempt to abstract the distributed nature of the underlying hardware system by changing the way the functionality of the application translates into software code; in these systems, the application is developed as a set of interoperating "component objects" with the assumption that every object is remote relative to any other object and the system is left to distribute the running set of objects in a transparent fashion and assist their interactions. While these systems should theoretically scale linearly to large system sizes, in practice, they rarely do. This is related as much to the fact that the system typically requires single vendor software to execute on all nodes and deliver most of the infrastructure the application might need, as to the fact that all aspects of the application have to be re-written specifically for the given system at a great expense.

The evolution of distributed applications over the last 15 or so years has shown clearly that the only successful approach to building such applications is network-based systems, also known as multi-tier architectures. With this approach, the application is constructed as a network of servers, configured to run mostly pre-existing software engines, such as web servers, database servers, Java application servers and similar to them, and specialized appliances, such as firewalls, load balancers and network attached storage. The application-specific content and code are deployed to the appropriate servers and each server typically is configured to execute a single function of the application.

The "one server—one function" principle is key to making network-based systems work. With this approach, the logical structure of the distributed application and the physical structure of the hardware system on which it executes become isomorphic, allowing one to use network monitoring and management tools and systems to gain visibility into the application and control its execution.

It is not accidental that most truly scalable Internet applications today, such as Google, Amazon.com, eBay, Yahoo! and many others, are implemented as network-based systems.

Despite its evolutionary success to date, the network-based approach to building distributed applications has three fundamental shortcomings which aggravate each other and limit significantly the ability to deliver new applications to market.

First, the network-based approach results in tightly-coupled configurations of servers, network switches, appliances, storage and software. Each cluster is built to fit the architecture of the individual application; configuring the application requires coordinated changes in the configurations of all of the above elements, which, in turn, require multiple specialists to effect the changes. The resulting system is very fragile, difficult to modify, and extremely difficult to tune and troubleshoot.

Second, the one server—one function principle, which is the only way by which these systems can be reasonably constructed, leads to a proliferation of underutilized servers that have to be individually maintained and administered, and consume huge amounts of power, air conditioning and physical space.

Finally, the large number of servers used to build manageable network-based systems means that using proprietary operating systems and infrastructure software in them is exceedingly expensive since those products are usually licensed per server or per processor and are value-priced assuming deployment on very few servers. As a result, typical network-based systems are built with the wide-spread use of open source software, including operating systems, web servers, database engines, etc. The providers of open source software, however, derive revenue primarily from support and consulting which leaves them with little incentive to make their products easy to install, configure and operate. As a result, the complexity of network-based systems is amplified by the complexity and fragility of installing and configuring dozens of instances of open source software packages.

All this means that network-based systems are brought to market only through massive application of highly qualified manpower. While this approach is acceptable and justified when constructing unique and large services, such as Google, its impact on a typical business application is nothing short of devastating. The amounts of capital expenses, effort and money spent by a typical enterprise between the time the application code is complete and the time the application is successfully deployed to operations exceeds today the amount of money and time spent developing the application itself by a wide margin, often exceeding the total spending on development and operations together.

The negative results of the enormous complexity of today's application delivery process are easily visible. Over 40% of the defects found in the applications successfully escape the testing cycles and are reported by end users as negative experience. Over 50% of the attempted deployments of such applications fail due to hard-to-find configuration errors and have to be rolled back. Finally, the long and expensive process of delivering distributed applications means that enterprise IT departments become extremely risk-adverse and resist changes that are required for the enterprise to respond to market conditions.

There is clearly a tremendous need for a solution that can simplify and accelerate significantly the process of delivering distributed applications on commodity hardware systems, while preserving the ability to use widely existing software, particularly open source infrastructure, in the construction of such applications. Such solution must also make it easy to implement a fluid, iterative process of modifying the applications and adding functionality to them, so that new business services can be delivered to market within the same quarter when the need for them is identified rather than 3 or 4 quarters later, as is the case frequently today.

REFERENCES CITED

| U.S. Pat. Documents | | | |
|---|---|---|---|
| 6,226,692 | May 1, 2001 | Miloushev et al. | 719/316 |

| Other References | |
|---|---|
| [Whitehorse] | U. S. patent application "Architecture for Distributed Computing System and Automated Design, Deployment, and Management of Distributed Applications", Brown et al., 10/789,440, Feb. 26, 2004 |
| [Collective] | U. S. patent application "Cache-based system management architecture with virtual appliances, network repositories, and virtual appliance transceivers", Sin-Ling Lam et al., 11/007,911, Dec. 8, 2004 |
| [Xen] | Paul Barham et al., "Xen and the Art of Virtualization", available from ACM 1-58113-757-5/03/0010 |
| [Xen-Mig] | Cristopher Clark et al., "Live Migration of Virtual Machines", presented at the $2^{nd}$ Symposium on Networked Systems Design and Implementation held in Boston, May 2-5, 2005 |
| [NBD] | Network Block Device, an open source project available hosted at http://nbd.sourceforge.net/ |

SUMMARY OF THE INVENTION

It is now, therefore, an object of the present invention to provide a set of abstractions for expressing the structure of a distributed application in a hardware-independent way and for simplifying the configuration, integration and modification of such applications. Together, these abstractions form a cohesive model for defining and operating distributed applications which we will call the "application model".

Another object of the present invention is to define a method for visually designing, constructing, troubleshooting and deploying distributed applications. The method is based on the application model and can be implemented as a graphical user interface delivered via web browser or other presentation means. It makes it possible to design, implement and deploy a wide variety of distributed applications in a way that is much simpler, faster and less error-prone than the prior art.

A further object of the present invention is to define a system that implements support for the application model, provides tools to practice the method, and includes an execution environment for deploying and operating distributed applications on a wide variety of hardware configurations.

The application model includes a model for virtualizing the hardware resources of distributed systems that consist of networks, servers and storage. Resource virtualization in the present invention is based on three key abstractions: virtual machines, virtual storage volumes (hereinafter, virtual volumes), and virtual network interfaces. Using these abstractions, the present invention defines a way to present an arbitrary distributed hardware system as three pools of virtual resources: a pool of virtual machines, a pool of virtual volumes and a pool of virtual network interfaces.

A key aspect of the application model is the notion of a virtual appliance. A virtual appliance is an instantiable object that consists of a virtual machine, one or more virtual volumes and one or more virtual network interfaces. The appliance encapsulates a complete software stack, including an operating system, middleware and similar software services, and a distinct application service that implements a specific function to be used in a distributed application (e.g., a web server, a load balancer, a database engine). Virtual appliances can be instantiated, configured, interconnected and controlled from the outside, in a uniform way that does not depend on the function of the appliance or on the specific set of software modules included in it.

In particular, virtual appliances are configured through a universal property interface similar to property interfaces known in object-oriented programming systems (such as Microsoft® Visual Basic, Java Beans, Microsoft ActiveX controls). Each appliance also defines a set of terminals through which it interacts with other virtual appliances. Terminals provide a uniform way for expressing connections between virtual appliances and defining structures of interconnected appliances.

Another aspect of the application model is the ability to define composite virtual appliances that encapsulate structures of interconnected virtual appliances into a boundary which makes it possible to instantiate, configure and control the whole structure as a single virtual appliance that can be further connected to other, external virtual appliances. Composite virtual appliances make it possible to express application subsystems and entire applications in a uniform way, enabling hierarchical composition as a primary method for designing and implementing distributed applications.

Using virtual appliances as basic building blocks for composing distributed applications has many advantages, one of which is the fact that all actions necessary to construct an application can be expressed as combinations of only four basic activities: instantiating appliances, setting configuration parameters on appliance instances, connecting terminals of appliances and defining boundaries for new appliance classes.

Another object of the present invention is to provide a way to express each of the above basic activities visually, thereby defining a visual method for designing, implementing, troubleshooting and deploying application subsystems and entire distributed applications. The method is based on a familiar user interface metaphor in which the application is drawn by dragging components from a palette onto a canvas, connecting them on the canvas, and editing properties and other configuration parameters of each component through property sheets. Using this method, the application is defined as a set of virtual appliance classes, some of them representing composite appliances, and a "main" composite appliance that contains the logical structure of interconnected appliance instances which implements the application functionality.

Yet another object of the present invention is to provide a system that virtualizes hardware resources, implements runtime support for virtual appliances, composite virtual appliances and virtual applications; and provides a set of user interface and build tools to support the visual method of designing and implementing virtual distributed applications and for deploying and operating such applications on a wide variety of hardware configurations. In particular, the system allows a distributed application to be executed on a single server without network connections or external storage. The system further makes it possible to execute the same application without any modifications on a cluster of two or more servers with direct-attached storage; on a cluster of blade servers with shared storage area network (SAN); or on many other possible distributed hardware systems, including a geographically distributed collection of clusters.

The system further enables multiple distributed applications to be executed while sharing the same set of hardware resources and while protecting each application from undue interference caused by the operation of another application. The system further allows the operator to modify dynamically the actual amount of hardware resources committed to each application within the limits prescribed by the application designer. The operator can scale the execution of the application up or down by modifying its resource budget while the application is running and the system will effect such changes in a manner transparent to the application and without interruption of service.

Another object of the present invention is to provide a way to export a distributed application on storage media, or over a network, in a self-contained way, as a single archive that contains the complete application image free of any hardware dependencies. Such archive can be easily imported by another instance of the inventive system and the application can be started on the new system immediately, without requiring any manual intervention, modifications or assignment of hardware resources.

Aspects of the Invention

One aspect of the present invention is a system and method for virtualizing network interactions.

Another aspect of the present invention is a method and system for virtualizing hardware resources in a distributed system.

Another aspect of the present invention is a virtual appliance apparatus for packaging and deploying pre-integrated and pre-tested software stacks consisting of operating systems, middleware, application components and other software in a form that is easy to instantiate, configure and interconnect.

Another aspect of the present invention is an apparatus and method for configuring pre-integrated and pre-tested software stacks through a uniform interface in a way that is independent of the configuration and functionality of the particular stack.

Another aspect of the present invention is method and system for instantiating pre-configured and pre-tested software stacks and applying different configurations to each instance.

Another aspect of the present invention is a method and system for defining and operating structures of interconnected and configured instances of virtual appliances.

Another aspect of the present invention is a composite appliance apparatus for packaging, configuring, instantiating and deploying entire structures of interconnected and configured instances of virtual appliances as single entities.

Another aspect of the present invention is a method and system for using pre-packaged and pre-tested software stacks from a catalog.

Another aspect of the present invention is a method and system for constructing entired distributed applications as hierarchical structures of interconnected and configured virtual appliances.

Another aspect of the present invention is a method and system for packaging an entired distributed application into a configurable virtual appliance.

Another aspect of the present invention is a method and system for automatic provisioning and deployment of distributed applications on a variety of hardware configurations.

Another aspect of the present invention is a method and system for automatically packaging, storing and transferring entire distributed applications from one hardware system to another.

Another aspect of the present invention is an apparatus, method and system for visual design, construction, deployment and operation of distributed applications.

Another aspect of the present invention is an apparatus, method and system for rapid delivery of distributed applications.

Another aspect of the present invention is a method and system for scaling the execution of distributed applications on demand without interruption of service.

Another aspect of the present invention is a method and system for utility computing.

Advantages

One advantage of the present invention is the ability to virtualize network interactions within a distributed application, so that the application can be deployed on different networks without modification and the physical transport used for any of such interactions can be changed while the application is running without disrupting its operation.

Another advantage of the present invention is the ability to virtualize all resources in a distributed hardware system required to deploy and execute a distributed application on that system, so that the application can be configured and integrated in a hardware-independent way and then deployed on a variety of different hardware systems without modifications.

Another advantage of the present invention is the ability to package a complete software stack, including pre-existing operating system, middleware and application components, into a virtual appliance that is pre-integrated and pre-tested, can be configured in a uniform way, and can be easily connected with other such appliances, so that distributed applications can be configured and integrated quickly and easily.

Another advantage of the present invention is the ability to configure an arbitrary virtual appliance in a uniform way and apply such configuration to the software integrated within the appliance automatically, so that new virtual appliances can be easily created by integrating existing software and used without needing to know the specifics of that software.

Another advantage of the present invention is the ability to package existing and new software into virtual appliances that can be interconnected into a wide variety of structures without requiring any modifications to the configuration of the software operating inside each appliance.

Another advantage of the present invention is the ability to separate different interactions between the software running inside an appliance and other appliances by logical function of each interaction, so that illegal or erroneous communications can be detected and prevented, while legal interactions could be easily monitored at runtime.

Another advantage of the present invention is the ability to arrange interactions between virtual appliances so that new functions can be implemented as separate virtual appliances and inserted between previously interacting appliances to modify the behavior of the application without modifying existing appliances.

Another advantage of the present invention is the ability to specialize a virtual appliance by configuring the appliance with a reference to an external virtual storage volume and a path to a directory on that volume from which the appliance can access code, data or both, so that application-specific appliances could be easily created by combining standard appliances and application-specific code and content.

Another advantage of the present invention is the ability to easily define a virtual appliance class that includes all software and internal configuration data required for the appliance to execute, and then create automatically multiple instances of such class that serve different roles within an application and each is configured and interconnected differently from the others.

Another advantage of the present invention is the ability to define instantiable virtual appliance classes using existing software packages that are not designed to support instantiation, so that instantiable appliance classes can be created quickly and easily. As used herein the word "instantiable" means "one from which instances of objects in the same class can be created while retaining the relation of the objects to their class".

Another advantage of the present invention is the ability to define a structure of interconnected and configured instances of virtual appliances that, together, perform a given function and instantiate such structure on demand from a static descriptor.

Another advantage of the present invention is the ability to package structures of interconnected and configured virtual appliances that, together, perform a given function, into composite appliances that can be instantiated, configured and used as easily as a single virtual appliance.

Another advantage of the present invention is the ability to define a configuration parameter of a composite appliance that is propagated automatically to multiple subordinate virtual appliances, so that a configurable parameter that needs to be maintained synchronized among multiple virtual appliances can be configured from a single place.

Another advantage of the present invention is the ability to construct a composite appliance so that multiple subordinate appliances that need to interact with the same external service can be connected to such service from a single place.

Another advantage of the present invention is the ability to combine multiple classes of virtual appliances into a common catalog that can be published and used in multiple applications, so that applications can be designed quickly and easily by reusing a wide variety of pre-existing virtual appliances.

Another advantage of the present invention is the ability to construct arbitrarily complex distributed applications as structures of interconnected and configured virtual appliances, so that complex distributed applications can be designed, implemented and delivered rapidly, while remaining easy to modify and extend.

Another advantage of the present invention is the ability to package an entire distributed application into a composite virtual appliance that can be quickly configured and deployed without any knowledge about its internal operation.

Another advantage of the present invention is the ability to capture sophisticated designs of distributed applications as structures of interconnected and configured virtual appliances into reference designs that are easy to customize and reuse, so that multiple different applications of the same type can be built and delivered quickly.

Another advantage of the present invention is the ability to construct distributed applications in a manner independent of any particular hardware configuration and deploy them automatically to a variety of hardware systems without modification.

Another advantage of the present invention is the ability to package an entire distributed application into a portable archive that can be transferred to another hardware system and deployed there without requiring modifications.

Another advantage of the present invention is the ability to package an entire distributed application into a portable archive that can be transmitted to multiple geographical locations and deployed there simultaneously over a short period of time.

Another advantage of the present invention is the ability to construct distributed applications that can be easily deployed and executed on a single computer emulating the target operating environment, so that distributed applications can be developed and tested without requiring access to complex hardware configurations.

Another advantage of the present invention is the ability to easily integrate application components provided by different vendors by packaging each of them into a virtual appliance, so that best-of-breed software can be combined easily in a manner for which they had not been originally designed.

Another advantage of the present invention is the ability to abstract third-party application components by packaging them into virtual appliances with standard boundary, so that an existing component can be replaced by a component from another vendor without having to modify the rest of the application.

Another advantage of the present invention is the ability to package open source software into virtual appliances that are easy to integrate, configure and deploy without requiring knowledge of the operation and configuration of the software, so that open source infrastructure software can be used by less sophisticated application designers and administrators.

Another advantage of the present invention is the ability to construct distributed applications visually, so that applications can be easily designed, constructed, understood, verified and modified when necessary.

Another advantage of the present invention is the ability to define a model of a distributed application that is simple enough to be understood by most practitioners and yet sufficient to automatically construct a running instance of the application on the target hardware, so that discrepancies between the logical design of the application and the actual executing application can be avoided.

Another advantage of the present invention is the ability to design, construct, test and deploy distributed applications quickly and easily, so that new business services can be delivered and existing services updated inexpensively and in timely fashion.

Another advantage of the present invention is the ability to correlate monitoring information captured as the application executes with the logical structure of the application, so that the application debugging and tuning can be performed in the same terms in which the application design is defined.

Another advantage of the present invention is the ability to provide high visibility into the operation of the executing application, so that the application can be managed easily and developing problems can be identified and resolved proactively.

Another advantage of the present invention is the ability to scale up executing distributed applications on demand by adding hardware resources to a running application without interruption of service, so that applications can meet changing loads without having to overprovision hardware.

Another advantage of the present invention is the ability to scale down executing distributed applications on demand while meeting guaranteed performance targets, so that unused hardware resources can be reallocated.

Another advantage of the present invention is the ability to migrate a portion of an executing distributed application on to a remote hardware system without interruption of service, so that unanticipated loads or hardware failures can be handled without having to complicate the application design.

Another advantage of the present invention is that it enables utility computing by making it possible to construct, deploy and execute a distributed application in a remote data center where multiple applications can share a pool of hardware resources, so that a business can deploy and use large applications without owning and operating its own data center.

BRIEF DESCRIPTION OF THE DRAWINGS

The various embodiments, features and advances of the present invention will be understood more completely hereinafter as a result of a detailed description thereof in which reference will be made to the following drawings:

FIG. 7 illustrates the preferred text descriptor of a virtual appliance;
FIG. 14 illustrates the preferred text descriptor of a composite appliance.

DESCRIPTION OF THE PREFERRED EMBODIMENT

Figure 1:
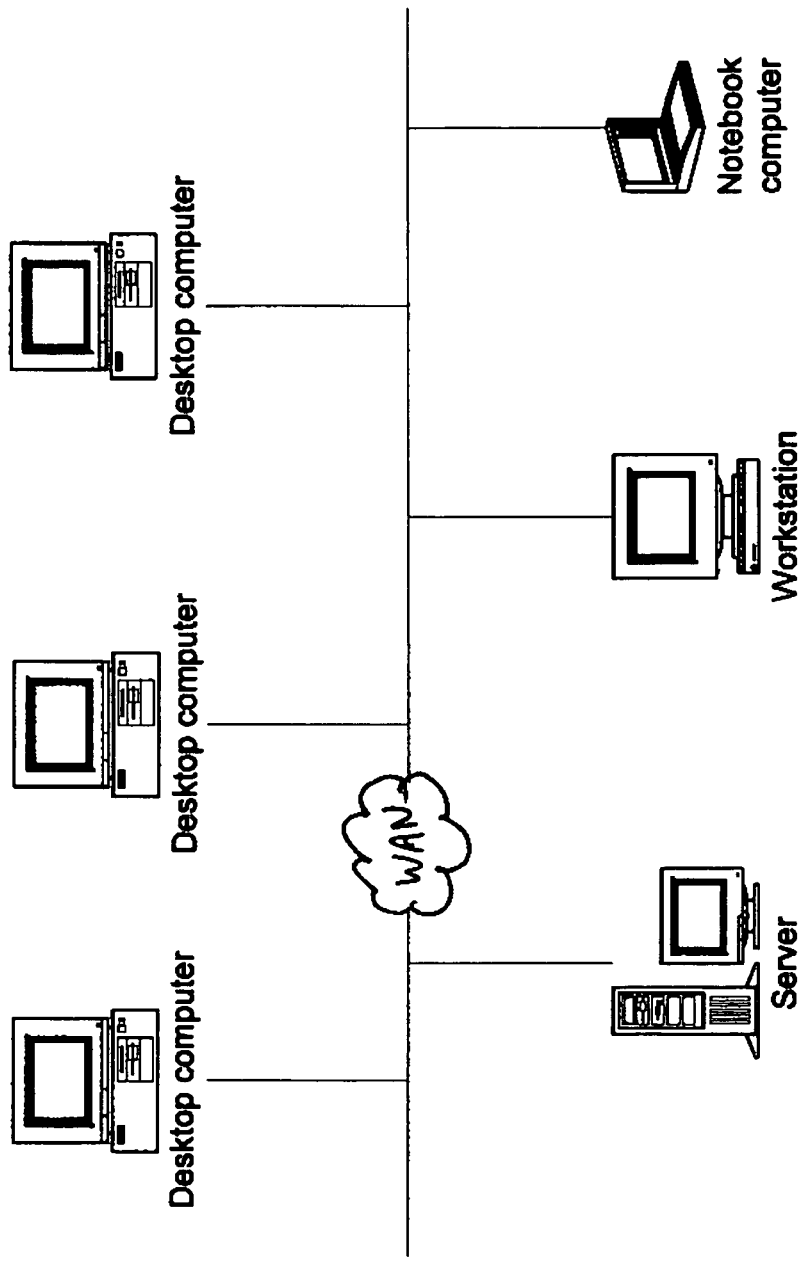
FIG. 1 illustrates a prior art computer network.
Figure 2:
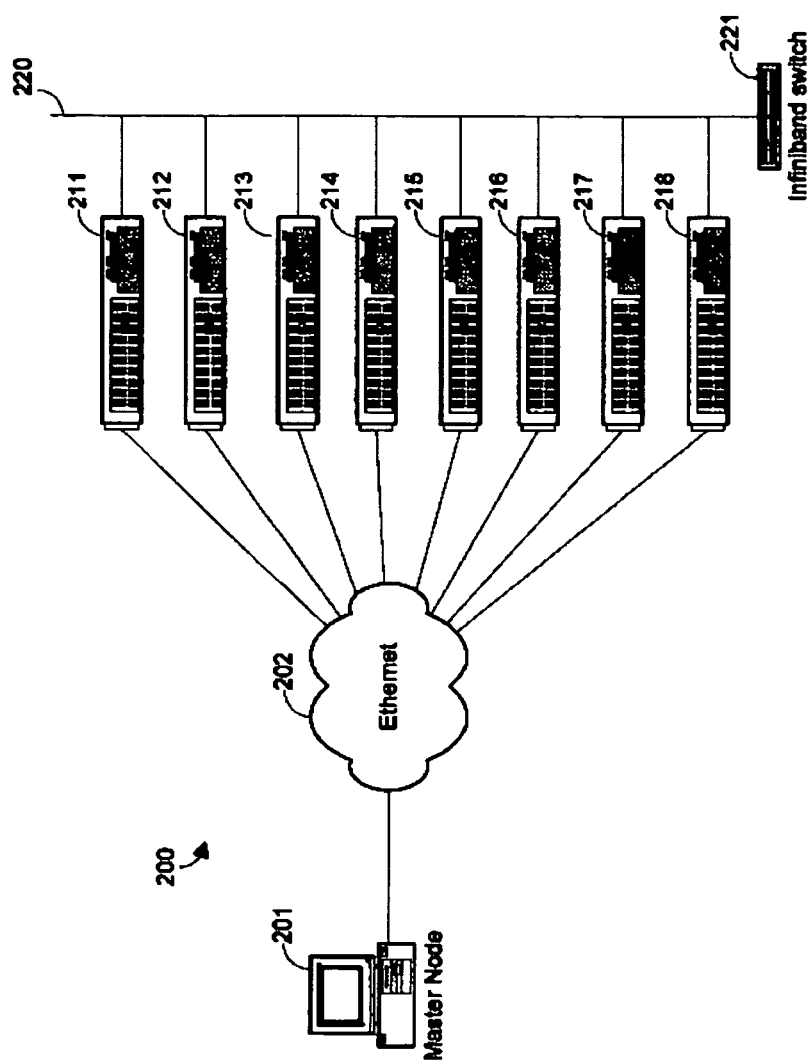
FIG. 2 illustrates a prior art commodity cluster system.
Figure 3:
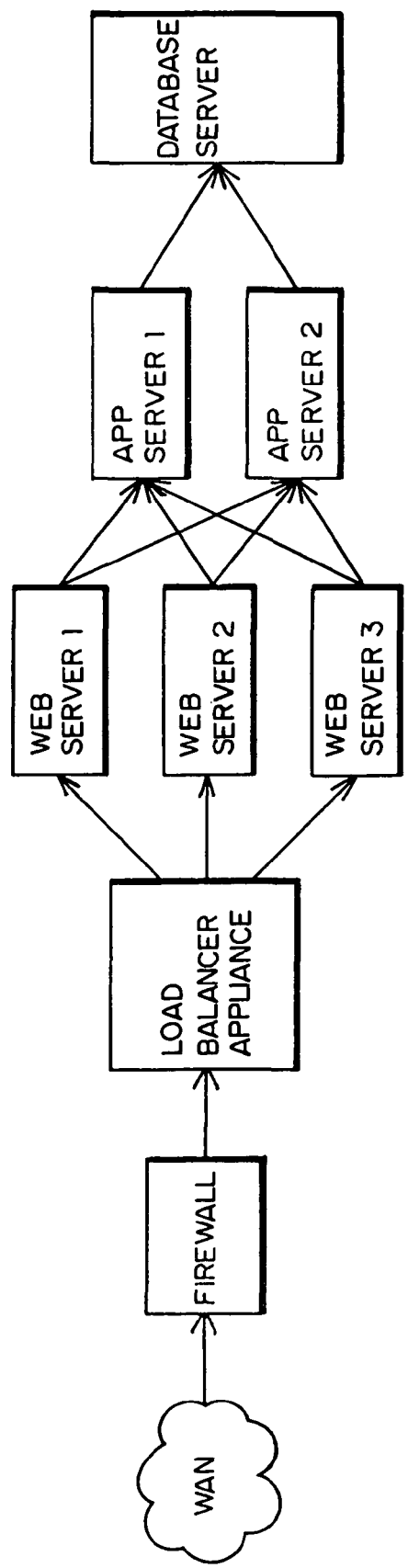
FIG. 3 illustrates a prior art n-tier distributed application.

The preferred embodiment of the present invention comprises an application model, a visual method and a system for rapid delivery of distributed applications. In this section, the phrase "inventive system" refers to the preferred embodiment and/or to alternative embodiments of the present invention.

1. The Application Model

The application model defines several abstractions which, taken together, make it possible to express the structures and behavior of complete distributed applications. Those abstractions can be grouped in the following way: virtual resources, virtual appliances, composite appliances, catalogs of appliances, and applications.

The present invention defines and utilizes various abstractions using metadata. By metadata, we mean data that captures or defines characteristics of a given entity separately from the entity itself, thereby making it possible to construct, operate, execute, control or otherwise manipulate that entity or sets of different entities. This definition is consistent with most prior art definitions of metadata but is more specific. An XML document schema, a SOAP interface definition and the descriptor 700 in FIG. 7 are all examples of metadata, while program code, binary executables and scripts are not metadata, and neither are pure data, such as graphical images, accounting information, etc. Simple types of metadata are often used to associate additional information with an entity. Comments in program code, markup tags in HTML documents, and the range of acceptable values for a database fields are all examples of such metadata. More sophisticated types of metadata are used to capture structural relationships between entities, as well as the organization of more complex entities composed from other entities. An XML document schema (but not an XML document itself), a "make" file of a software project, and a set of policies for managing IT infrastructure are all examples of this type of metadata. Note that in specific embodiments, the same metadata may be expressed using different means and forms, including descriptor languages like XML, graphical notations and structure diagrams, and databases. To avoid ambiguity, throughout this disclosure we have used the more specific terms, such as descriptor or diagram, to identify metadata. However, the particular form of expressing the metadata in a particular embodiment is not material for practicing the present invention.

Virtual Resources

The present invention uses resource virtualization to abstract the underlying hardware system and to make it possible to define the rest of the application in a hardware-independent way. The invention defines three key types of virtual resources: virtual machines, virtual volumes and virtual network interfaces.

In the preferred embodiment of the present invention, the hardware system consists of computing and/or storage nodes interconnected through a suitably fast network, with at least one node acting as a system controller. Each node on the network preferably exposes one or more pools of virtual resources, one pool for each resource type. For each resource type, the system controller aggregates multiple discrete resource pools, exposed by the various nodes in the system, into a single, distributed resource pool. As a result, there is a single system-wide resource pool for each type of virtual resource. Virtual resources are allocated/created from their respective system pools and carry a system-wide identification which makes it possible to access a given instance of a virtual resource in a uniform fashion independent of where the resource is actually located.

Figure 4:
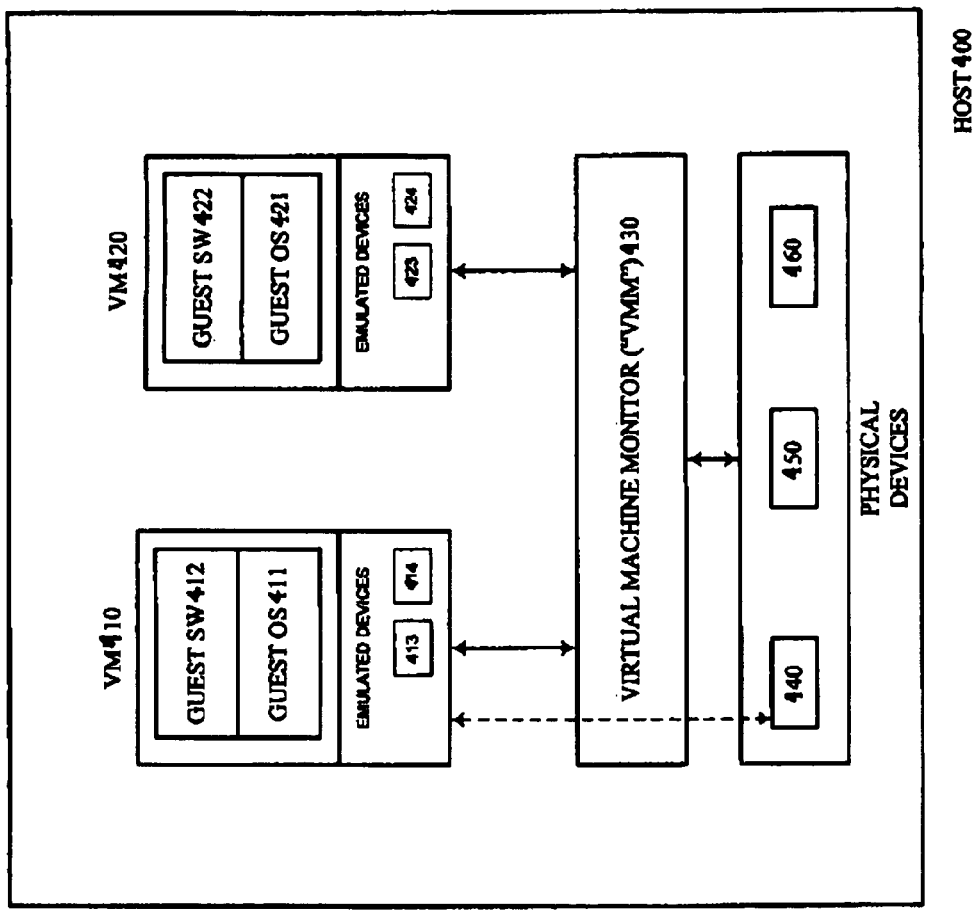
FIG. 4 illustrates a prior art virtual machine manager.

Virtual machines are preferably implemented by a prior art virtual machine management system. FIG. 4 illustrates the preferred architecture of a virtual machine management system, in which a virtual machine monitor 430 partitions a physical host 400 into multiple virtual machines, such as the virtual machines 410 and 420, and manages the access from virtual devices 413, 414, 423 and 424 to physical devices 440, 450 and 460. Each virtual machine is capable of booting a general-purpose operating system, such as 411 and 421, and any other software that it may be configured to run.

Most virtual machine managers virtualize access to at least two types of peripheral devices, namely network interfaces and block storage devices. When configuring an individual virtual machine, one can specify a set of virtual network devices and a set of virtual storage devices for that virtual machine, and define how those virtual devices should be mapped to the actual physical devices of the host. In addition, some virtual machine managers make it possible to map a virtual device of a given virtual machine to a logical device (network interface or disk volume) implemented by an operating system in another virtual machine. Virtual machine managers also allow individual virtual machines to be migrated from one host to another, transparently to the software that runs inside the virtual machine. An example of such prior art virtual machine manager is Xen, described in [Xen].

In the present invention, virtual machines are assigned a set of execution attributes that determine the minimum and maximum amounts of processing power, memory and network bandwidth that can be allocated to a given instance of a virtual machine, as well as to permit or prohibit the migration of the virtual machine.

Virtual storage volumes are logical block devices exposed by one or more hosts on the system and accessible from virtual machines running on the same or on other hosts. Virtual volumes are persistent, named objects, the size of which is defined at the time of creation and which reside on the system until explicitly destroyed. In the preferred embodiment, a virtual volume defined and exposed by one node is accessible from any node in the system, thereby allowing a virtual machine that uses the volume to be migrated freely to any node. One way to implement virtual volumes is by configuring [NBD] so that each individual virtual volume is stored in a file on one of the hosts, shared on the network as an NBD volume and accessed from the other hosts using the NBD client.

In the preferred embodiment, a virtual volume is typically accessed exclusively by a single virtual machine. This makes it possible and desirable to cache volume contents aggressively on the host on which the virtual machine accessing the volume is being executed. Such caching is easily accomplished, for example, by layering on top of the NBD client a block device driver that uses a file on a local physical disk to store copies of blocks recently accessed by the virtual machine.

Another aspect of the present invention is the ability to create multiple instances of the same virtual volume. Those are useful whenever there is a need to share a large set of data among multiple virtual machines in such a way as to permit each virtual machine to make relatively small number of modifications to the common set of data for its own use. Instantiable virtual volumes can be implemented by simply replicating the common volume for each virtual machine.

In the preferred embodiment, however, an instantiable volume is implemented by a combination of a "master" virtual volume which is common to all instances and contains the common data, and a "differential" virtual volume for each virtual volume instance, which accumulates the modifications made to the specific instance. The master volume and the differential volume are presented to the client virtual machine as a single block device, for example, by layering an appropriate block device driver over an NBD client that can access both virtual volumes.

Figure 5:
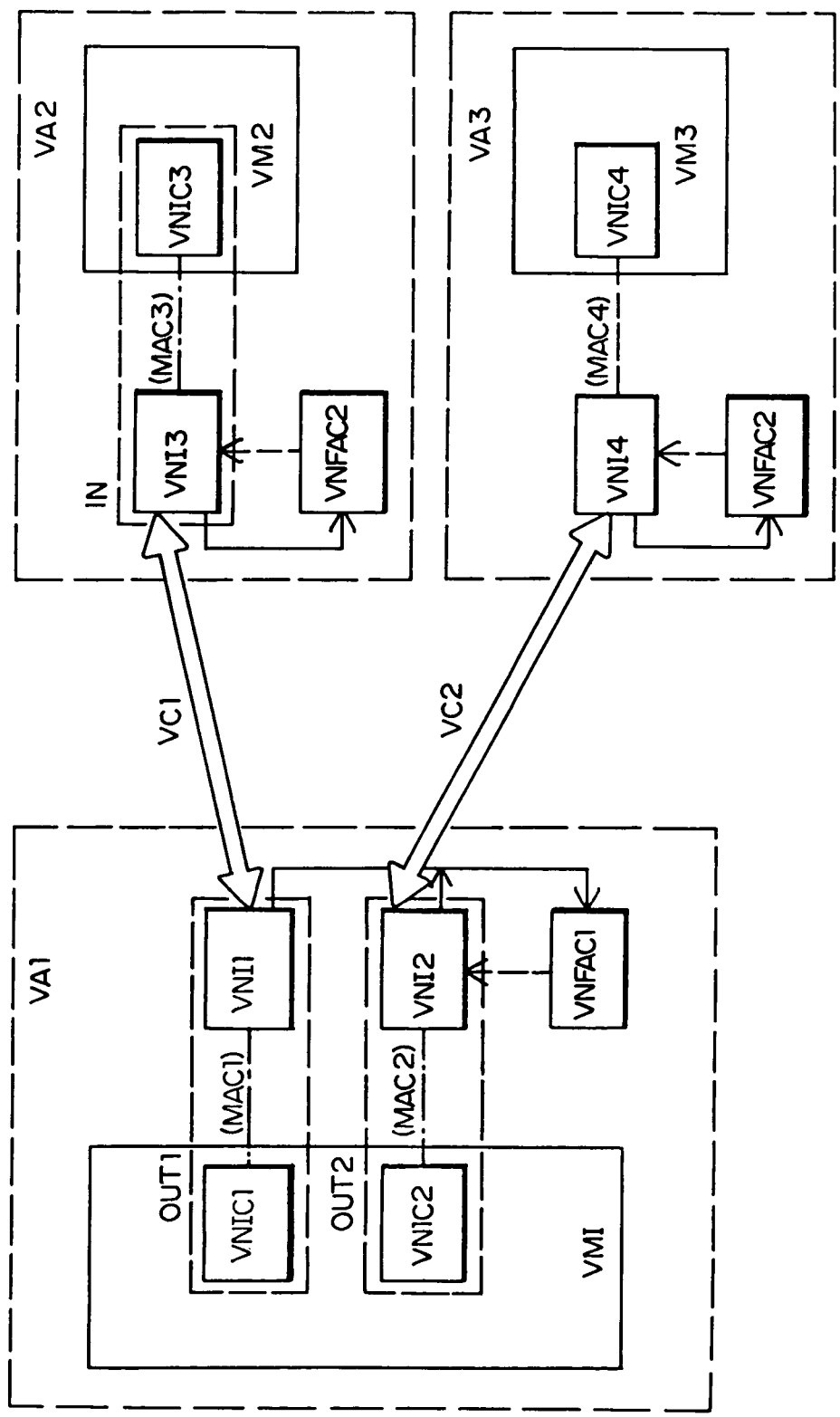
FIG. 5 illustrates the inventive virtual network interface.

FIG. 5 illustrates the inventive virtual network interfaces provided by the present invention. Virtual network interfaces are used to abstract the structure of the network interconnect inside the distributed application. A pair of virtual network interfaces, such as VNI1 and VNI3, is used to create a "virtual wire" between virtual network adapters vNIC1 and vNIC3, which belong to virtual machines VM1 and VM2, respectively. The virtual wire operates in a manner equivalent to a cross-over cable that connects two physical network interface cards directly: it transfers packets from one of the cards to the other and vice-versa.

In the preferred embodiment, virtual network interfaces are implemented by combining two types of objects, a virtual interface factory, such as VNFAC1, and a virtual interface instance, such as VNI1. The virtual interface factory is preferably attached to each virtual machine and creates one virtual interface instance for each virtual network adapter configured on its virtual machine. The factory configures each virtual interface instance with the MAC address of its respective virtual network adapter, thereby allowing the instance to intercept all outbound traffic from that adapter. The virtual interface instance VNI1 is also configured with information sufficient to establish connection with its counterpart, the virtual interface instance VNI3 using the physical network available in the hardware system. VNI1 intercepts outgoing traffic from vNIC1 and forwards it to VNI3 which channels the packets into vNIC3, optionally modifying packet headers to support the tunneling abstraction. Traffic in the opposite direction is handled the same way.

Depending on the physical network used, virtual wire VC1 can be implemented by tunneling application traffic (packets) between two virtual network interfaces through a TCP connection, UDP datagrams, InfiniBand reliable connection, or as direct memory-to-memory transfer whenever both VNI1 and VNI3 happen to be located on the same host, all of which is completely transparent to the communicating virtual machines VM1 and VM2. Indeed, it is possible to move the virtual wire VC1 from, for example, a TCP connection over Gigabit Ethernet, to a reliable connection over 10 Gigabit InfiniBand on the fly, transparently to the communicating virtual machines.

Virtual Appliances

Figure 6:
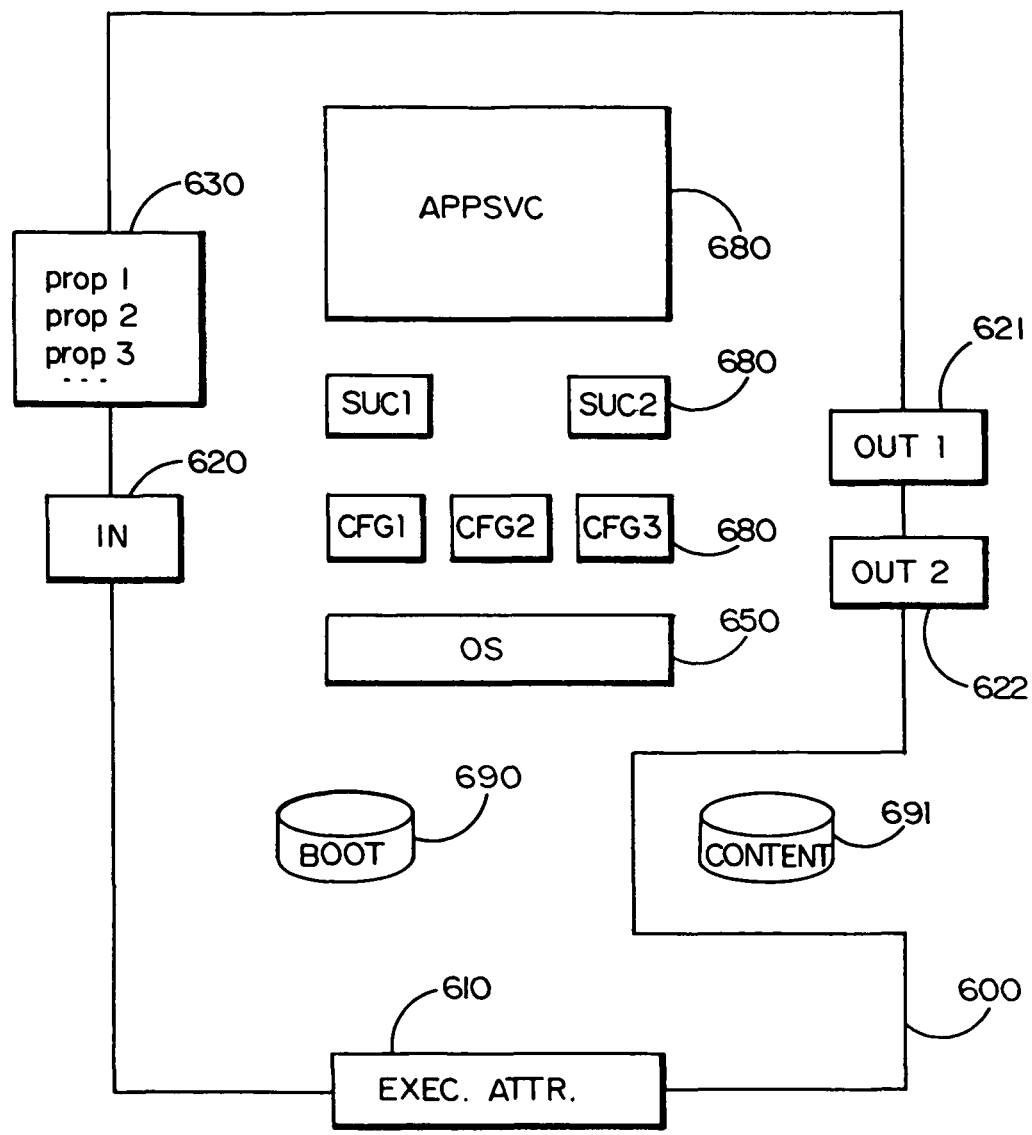
FIG. 6 illustrates the inventive virtual appliance.

FIG. 6 illustrates the inventive virtual appliance. The virtual appliance 600 consists of a boundary, boot volume 640, and interior. The boundary comprises the execution attributes 610, the terminals 620, 621 and 622, the properties 630, the content volume 641. The interior comprises operating system 650, configuration files 680, software services 660 and the application service 670. In the preferred embodiment, virtual appliances are defined by building a descriptor such as the descriptor 700 illustrated in FIG. 7.

In the preferred embodiment, virtual appliances are created by first defining a virtual appliance class using descriptor similar to 700 and then creating one or more virtual appliance instances that execute on the target system. The class is used as a template for creating instances.

Figure 8:
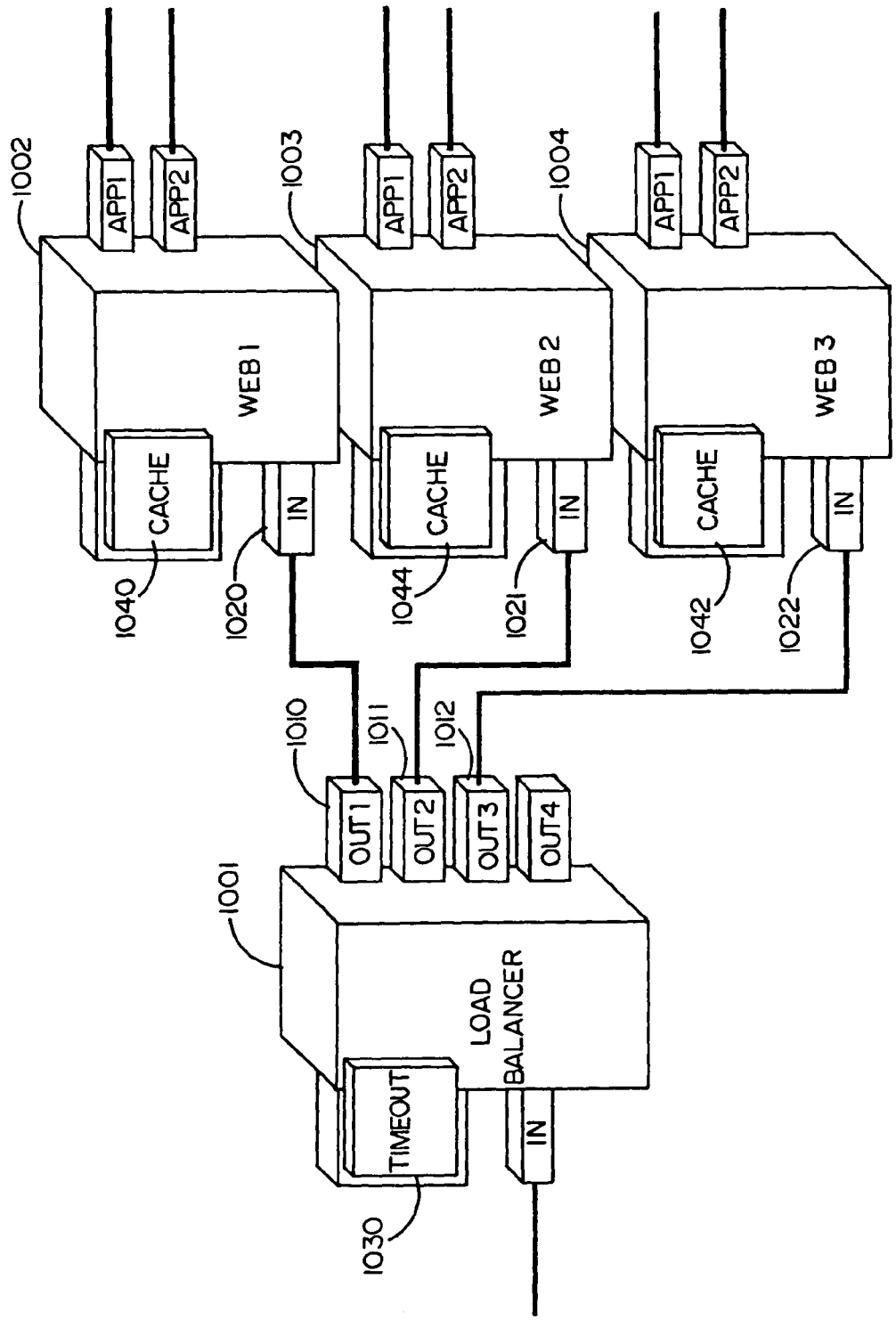
FIG. 8 illustrates instantiation of virtual appliances in the preferred embodiment.

FIG. 8 illustrates the process of creating multiple virtual appliance instances from one class. To create the instance 850, the system first creates a virtual machine with one virtual network adapter for each terminal, such as 881 and 882, and an instance of a virtual network interface for each of the adapters. In addition, the system creates one virtual block device for each volume 860.

The system next creates a virtual volume instance 860 by either replicating the class volume 810 or by creating a differential volume using the class volume 810 as a master, as described above, and binds it to the corresponding block device created above.

The virtual machine of the instance is created using the specific values assigned to the execution attributes. In addition, the instance is configured with the values 870 of the properties 820, preferably by modifying the configuration files 851 residing on the volume 860. Since volume 860 is an instance of the master volume 810, the modifications are private to the instance 850.

The system then proceeds to execute the virtual machine, resulting in the booting the operating system 852 and starting the various services 853.

The inventive process for defining virtual appliance classes and instances makes it possible to separate (a) the information and configuration that are common to all virtual appliances of a given class, such as the operating system and the application service code, and the configuration required to make them work together; and (b) the configuration and connection data that are specific for each instance of the virtual appliance based on its role in the distributed application.

Properties of Virtual Appliances

Unlike execution attributes, the set of which is preferably common to all classes of virtual appliances, in practice, each class of virtual appliances would have configuration parameters that are specific to the function and the implementation of the class. The present invention provides a mechanism for exposing the desired set of such configuration parameters to be modified by the application designer through a universal property interface modeled after properties of software components (such as Microsoft ActiveX controls).

With the inventive property mechanism, the designer of a virtual appliance class defines the set of properties 820, preferably by defining the name, data type and default value of each property as part of the class descriptor 700. In addition, within the same descriptor, the virtual appliance designer specifies the names of one or more configuration files 851, into which the values of the properties need be transferred at the time of instance creation.

Figure 9:
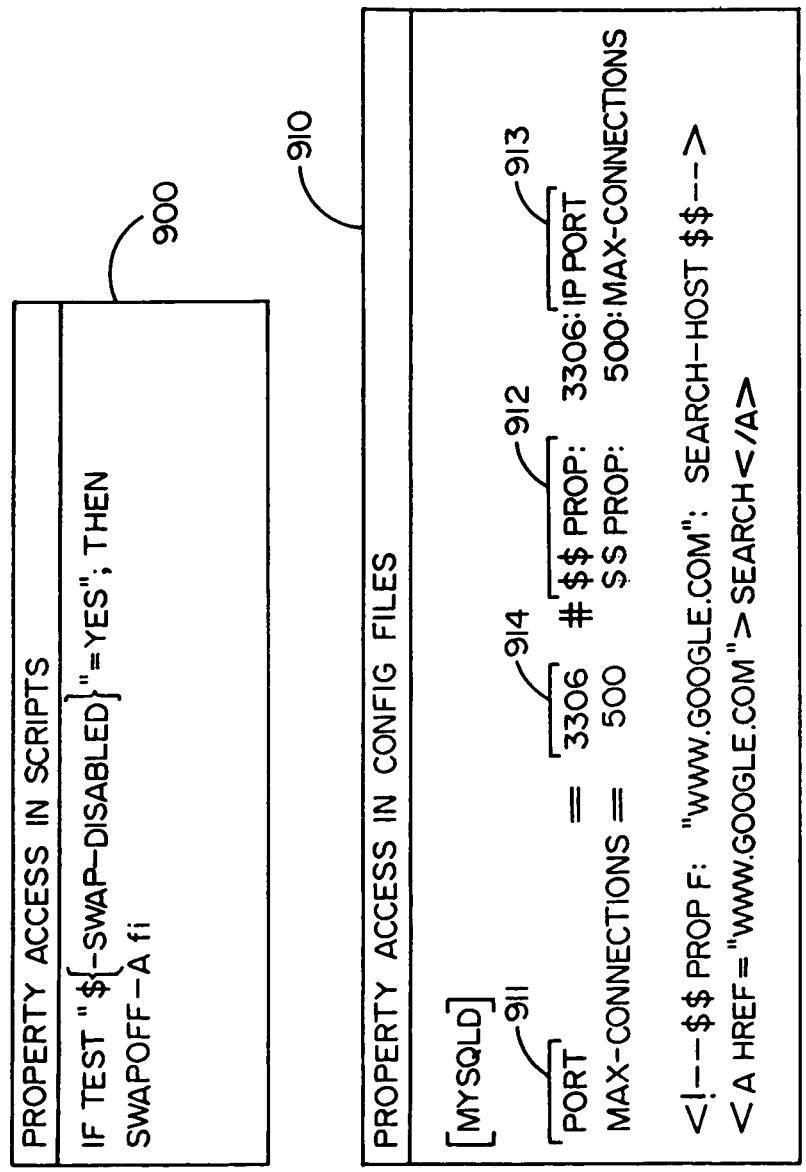
FIG. 9 illustrates the preferred property mechanism for virtual appliances.

FIG. 9 illustrates the preferred mapping of virtual appliance property values into configuration file settings and scripts that execute inside an instance of a virtual appliance. In the case of scripts 900, for each property defined in the appliance class the preferred embodiment provides an environment variable named after that property and initializes such variable to the value of the property with which the instance was configured. In the case of a text-based configuration file 910, a parameter 911 is set to a specific value 914. To map a property of the appliance to the parameter 911, the designer of the appliance adds a comment to the configuration file with a tag 912, identifying the appliance property name 913, which is to be mapped to the parameter 911. This is sufficient to cause the system to replace the value 914 with the value of the property 913 as set on the appliance instance.

Terminals of Virtual Appliances

In order to visually build structures of virtual appliances, the present invention defines the notion of terminals as connection points that represent endpoints for logical interactions between appliance instances. The inventive terminals are designed so that already existing software packages used inside virtual appliances can communicate through terminals without repairing modifications.

With reference to FIG. 6, a terminal could be an input, such as the input 620, or an output, such as the outputs 621 and 622. An input terminal is a terminal for accepting network connections; an output terminal is a terminal for originating network connections. With respect to the flows of requests and data, both types of terminals allow bidirectional transfers. A terminal preferably consists of a name, a virtual network adapter and a virtual network interface. When an output terminal of one virtual appliance instance is connected to an input terminal of another instance, the system creates a virtual wire between their respective virtual network interfaces, and assigns virtual IP addresses to both ends of the connection.

With reference to FIG. 5, the virtual appliance VA1 has a virtual machine VM1 and an output terminal OUT1, comprising vNIC1 and VNI1. This terminal is connected to the input terminal IN of the virtual appliance VA2 through the virtual wire VC1. Whenever the software running inside VM1 attempts to resolve the name of the output OUT1 as a network host name, the inventive system will provide it with the virtual IP address assigned to the opposite end of the virtual wire VC1 which is connected to the terminal IN. This has the effect of binding the network host name "OUT1" in VA1 to the IP address of the terminal IN of VA2.

Assuming that in the virtual machine VM2 of the appliance VA2, a software service is listening on a socket for incoming TCP/IP connections, an attempt to establish a TCP/IP connection to host name "OUT1" from inside VM1 will result in the connection being established with the software running inside VM2, with all traffic passing through the virtual wire VC1.

Volumes of Virtual Appliances

Each instance of the inventive virtual appliances has at least one volume from which it boots operating system and other software. These volumes are preferably provided as part of the class definition of the appliance and instantiated for each virtual appliance instance. In many cases, virtual appliances may have additional volumes that are not part of the class definition but are explicitly configured on each instance of the virtual appliance.

With reference to FIG. 6, the boot volume 640 may contain software and configuration necessary to boot a Linux operating system and run an Apache web server; this volume is part of the class definition and is instantiated for each instance of the appliance 600. The volume 641 may contain data specific to a given web site, for example, HTML files, images and JavaScripts. While the class definition for appliance 600 includes a reference to the specific volume 640, it only defines a placeholder for the volume 641, indicating that each instance of the appliance 600 must be explicitly configured with a reference to such volume.

Instantiating the appliance 600 and configuring the instance with a reference to the volume 641 has the effect of producing an instance of an Apache web server that serves the particular web site the content of which is located on volume 641. In addition, defining a property on the appliance 600 through which the appliance can be configured with a directory name on the volume 641 from which it would access the content allows multiple different instances of the appliance 600 to be configured with the same volume 641 but serve different content located in different directories on the volume.

The same pattern can be applied to design a generic J2EE server appliance that can be configured with a volume containing the EJB code packages for a particular application function, or a generic database server configured externally with a volume containing a specific database. In fact, using the combination of application volume plus directory path property, as described in the paragraph above, makes it possible to combine static content, code and data of the application on a single application volume which makes the application easier to modify and maintain.

Structures of Virtual Appliances

The inventive virtual appliances can easily be combined to form structures that perform advanced application functions. Assuming that all required appliance classes already exist, defining such structure involves three general steps: defining the set of instances; providing the desired configuration values for attributes, properties and volumes of each instance; and defining the connections between their terminals.

Figure 10:
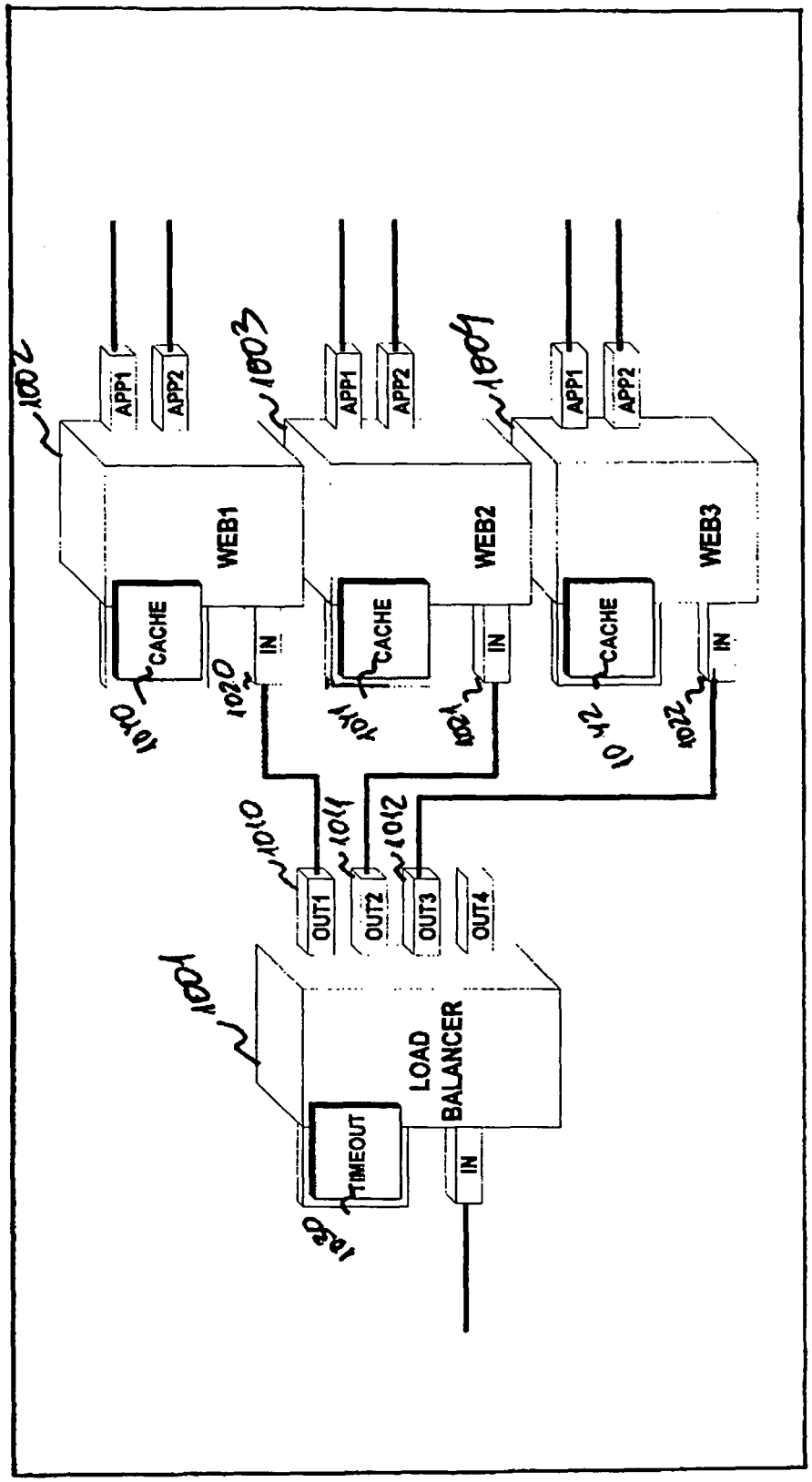
FIG. 10 illustrates the inventive structure of connected virtual appliances.

FIG. 10 illustrates a presentation tier of a web application implemented as a structure of virtual appliances. The structure consists of one instance of a load balancer appliance 1001, and three instances of a web server appliance, the instances 1002, 1003 and 1004. The outputs 1010, 1011 and 1012 of the load balancer 1001 are connected to the inputs 1020, 1021 and 1022 of the three web server instances, respectively. In addition, the load balancer 1001 is parameterized with a value for its TIMEOUT property 1030, and the web server instances are parameterized with a cache size value for their CACHE properties 1040, 1041 and 1042.

Arbitrarily complex structures of virtual appliances can be described in a uniform way by capturing the set of instances that participate in them, configuration parameters for each instance and the connections between their terminals. This allows the inventive system to instantiate such structures automatically, by interpreting such structure descriptions, instantiating virtual appliances, configuring them with the provided values and establishing virtual wires through which the appliances could interact.

To assist the design of appliance structures, it is preferable that each described instance is assigned a human-readable name that identifies the role that such instance plays within the structure.

Composite Appliances

Since the inventive system can easily instantiate structures of virtual appliances on demand and in a uniform way, it is now possible to define a new, inventive type of virtual appliances called Composite Appliances. A composite appliance comprises a boundary and an interior. The boundary of a composite appliance is defined in the same way as the boundary of a regular virtual appliance, and the interior of a composite appliance consists of a structure of virtual appliances.

Figure 11:
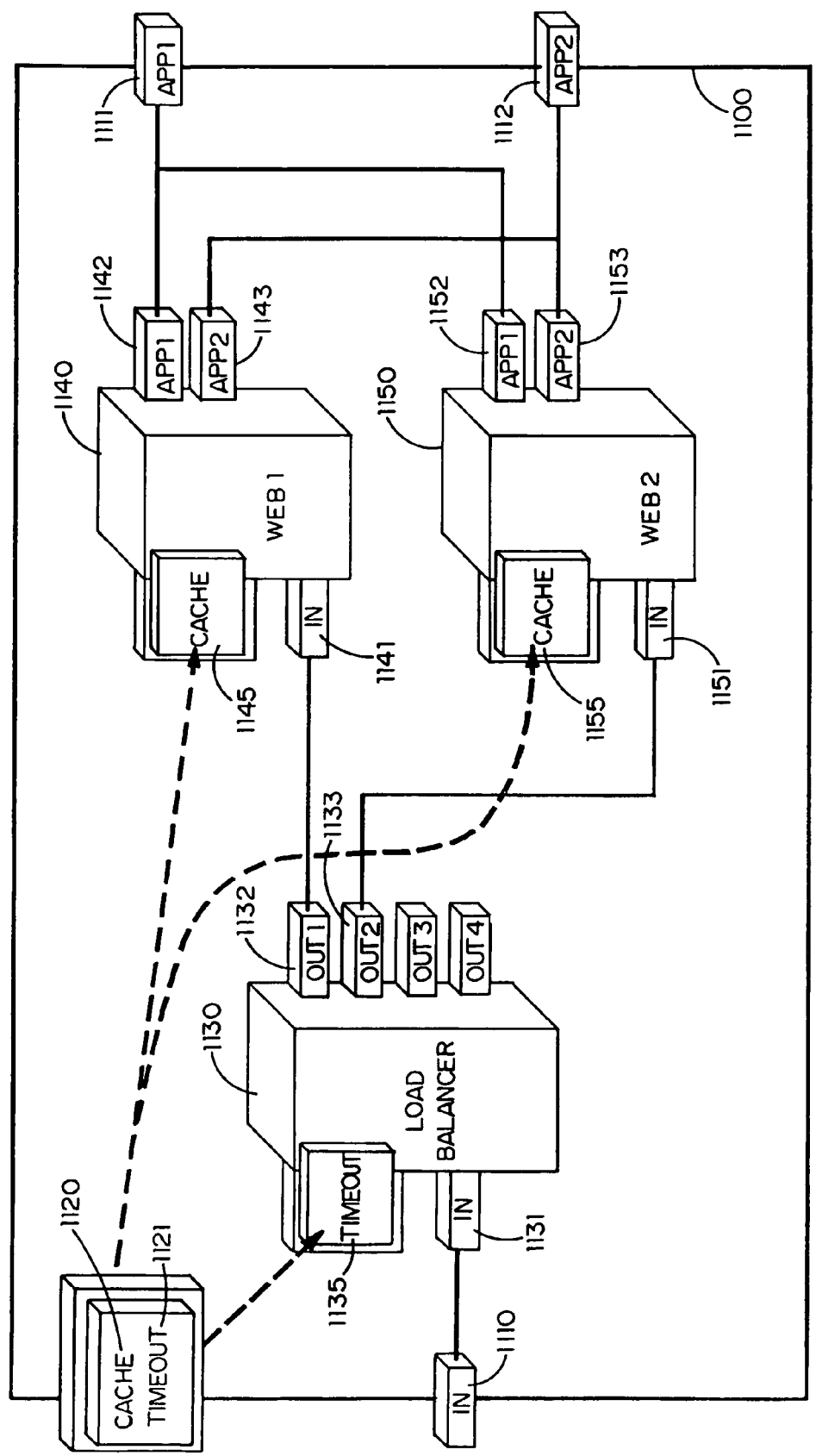
FIG. 11 illustrates the inventive composite virtual appliance.

FIG. 11 illustrates the inventive composite virtual appliance. It defines a new, composite appliance class 1100 that implements a scalable web tier of a distributed application as a single appliance. The boundary of the appliance 1100 comprises an input terminal 1110 and two output terminals 1111 and 1112, as well as properties 1120 and 1121. The interior of the appliance 1100 comprises the load balancer instance 1130 and two instances of a web server, the instances 1140 and 1150. The input terminal 1110 is connected to the input terminal 1131 of the load balancer; the outputs 1132 and 1133 of the load balancer are connected to the input terminals 1141 and 1151 of the web servers 1140 and 1150, respectively. The outputs 1142 and 1152 of the web servers are connected to the output 1111 of the composite; while the outputs 1143 and 1153 are connected to the output 1112.

Furthermore, property 1121 of the composite is redirected to the property 1135 of the load balancer 1130, while the property 1120 of the composite is redirected to the properties 1145 and 1155 of the web servers.

The resulting composite appliance 1100 can be used in any structure or application in the place of a web server such as 1140, without having to know anything about its interior or even the fact that it is a composite appliance. Unlike the web server 1140, it will deliver increased performance and increased resilience to hardware failures (since it can operate with one of the web servers 1140 or 1150 having failed), without increased visible complexity in the target application.

FIG. 14 illustrates the preferred text descriptor form of a composite appliance similar to the composite appliance 1100. The descriptor preferably assigns a name to the appliance class, identifies properties, terminals and volumes visible on the boundary of the appliance, lists the subordinate instances that form the structure of the appliance, assigning a name to each instance, identifying the class of the instance, and configuring each instance by assigning values to one or more properties, attributes and/or volumes; and describes the connections between terminals of subordinate appliances, as well as between the terminals defined on the boundary of the composite appliance and terminals of its subordinates.

In particular, the preferred descriptor provides a simple way to "redirect" a property of the composite appliance to one or more of its subordinates. For example, the property "cache_sz" of the web_tier composite appliance (assembly) is redirected to the property "cache_sz" of its subordinates "web[1]" and "web[2]" by means of specifying "$.cache_sz" in place of an explicit value in the configuration section of each of those subordinates. This has the effect of configuring each of the web1 and web2 subordinates with the actual value with which the web_tier composite is ultimately configured in the target application.

To implement support for composite appliances, the inventive system preferably implements a property mechanism that redirects properties of the composite to one or more properties of its subordinate instances, by redirecting configuration values set on an instance of a composite appliance to properties of the appropriate subordinates, as defined by the interior structure; and a terminal mechanism that forwards the configuration information required to create virtual wires received by the terminals of the composite appliance to the terminals of the appropriate subordinates to which they are connected. Such mechanisms can be implemented by the system runtime support similar to [XDL] or, preferably, by a structure linker utility that resolves property and terminal forwarding references prior to instantiating the application.

Catalogs and Applications

The present invention defines a way to package multiple classes of virtual appliances into class libraries called Catalogs. The catalogs can be used in multiple applications.

Each virtual appliance class preferably consists of a class descriptor and one or more volume images referenced by the descriptor. Each composite appliance class preferably consists of a class descriptor similar to the class descriptor of the regular virtual appliance classes and an interior descriptor that captures the structure that implements the composite.

A catalog preferably consists of a catalog package descriptor that identifies the classes included in the catalog and the class descriptors, volume images and interior descriptors of those classes. A catalog can be implemented as a shared directory on a network in which all descriptors and volume images reside. Alternatively, a catalog may be exposed through a web or ftp interface on the Internet.

Figure 12:
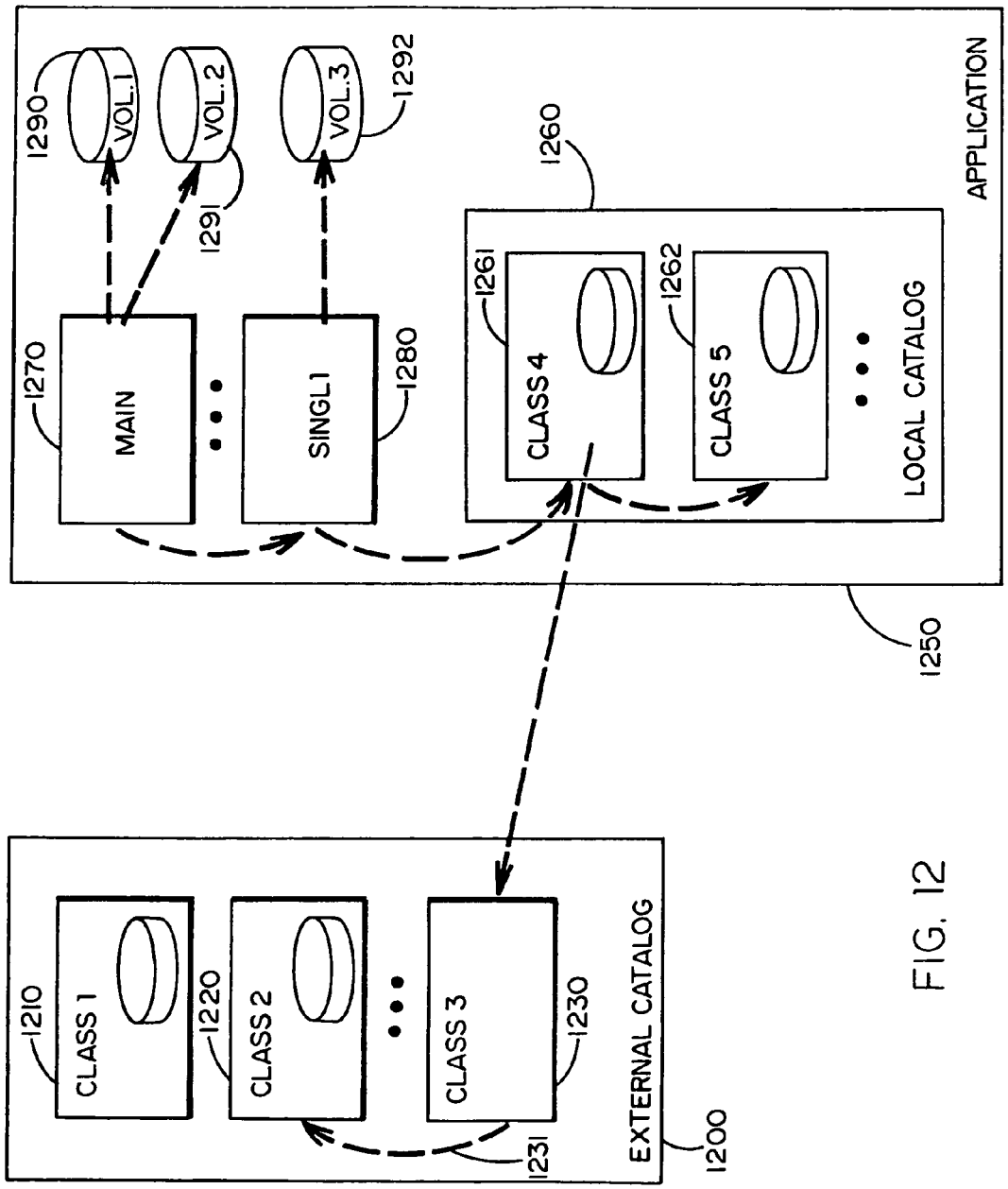
FIG. 12 illustrates the preferred structure of a distributed application.

FIG. 12 illustrates the inventive catalog structure. It includes the external catalog 1200, comprising classes 1210, 1220 and 1230. The classes 1210 and 1220 are regular virtual appliances and contain no references to other classes. Unlike them, the class 1230 is a composite virtual appliance and contains at least one instance of the class 1220 and, therefore, has a reference 1231 to the class 1220.

Classes included in catalogs preferably have names that are unique within the catalog. When a class makes a reference to another class contained within the same catalog, the name of that class is sufficient to resolve the reference. Whenever a class has a reference to a class belonging to another catalog, the name of the catalog is preferably pre-pended to the name of the class to form a name that is unique within the inventive system.

FIG. 12 also illustrates the structure of the inventive application. The application 1250 is described as a package that comprises a local catalog 1260, a MAIN singleton class 1270, and another singleton class 1280, as well as the application volumes 1290, 1291 and 1292. The local catalog 1260 is a catalog containing the classes 1261 and 1262 which are specific to the application 1250 and are not intended to be used outside of it.

The present invention defines a singleton class as a class of which only a single instance may be created. Singletons may not exist outside of the scope of an application and cannot be included in shared catalogs. Each application preferably has at least one singleton, the MAIN 1270, which includes the top-level structure of the application. In addition to the MAIN singleton, other singletons can be used to define subsystems of the application that are not intended to be instantiated by design. All singletons in an application preferably reside directly in the application package and outside of the local catalog.

Each application preferably contains one or more virtual volumes that are not directly associated with any virtual appliance class. Such volumes are preferably used to store application-specific content, code packages, libraries and databases, in a layout convenient for access by the operator and are bound by configuration to virtual appliance instances that require access to such data.

Using the Application Model

The abstractions defined in the application model are sufficient to describe constructively the structure of an arbitrary distributed application without references to the hardware system on which it would execute, and without explicit dependencies on the actual software functionality encapsulated in each of the virtual appliances. Moreover, the structure and configuration of the application defined in the terms of the application model can be easily expressed through a set of static descriptors using a structure descriptor language such as XML.

FIG. 7 and FIG. 14 illustrate the preferred structure description language used in the preferred embodiment of the present invention. As a structure description language, this language is semantically equivalent to XML but is less verbose and more suitable for direct editing by humans.

Using this language, an arbitrarily complex distributed application can be described in a set of text files, including (1) virtual appliance descriptors; (2) composite appliance boundary descriptors; (3) composite appliance interior (assembly) descriptors, and (4) package descriptors. This set of descriptors, together with the images of class volumes and application volumes, is sufficient to instantiate and execute the application on any hardware system that supports resource virtualization and other services defined by the present invention.

2. The Visual User Interface

Although it is possible to practice the present invention by expressing the application design directly in a structure description language using text editing tools, the preferred method of practicing the invention is to design, implement, integrate and deploy applications in a visual manner. This takes full advantage of the fact that all abstractions defined in the application model—virtual appliances, structures of appliances, composite appliances and whole applications— are easy to visualize and most operations with them are easy to implement as visual operations on a computer user interface.

This section describes the preferred user interface for visualizing distributed applications and operations on them. The phrase "the user can", "the editor allows the user to", and similar phrases, throughout this document, are used to also denote that "the editor has means to" or "the system has means to", as appropriate in context.

Overview

The primary functionality of the user interface is implemented by an application editor that makes it possible to create, edit and save the descriptor files that comprise a distributed application.

Figure 13:
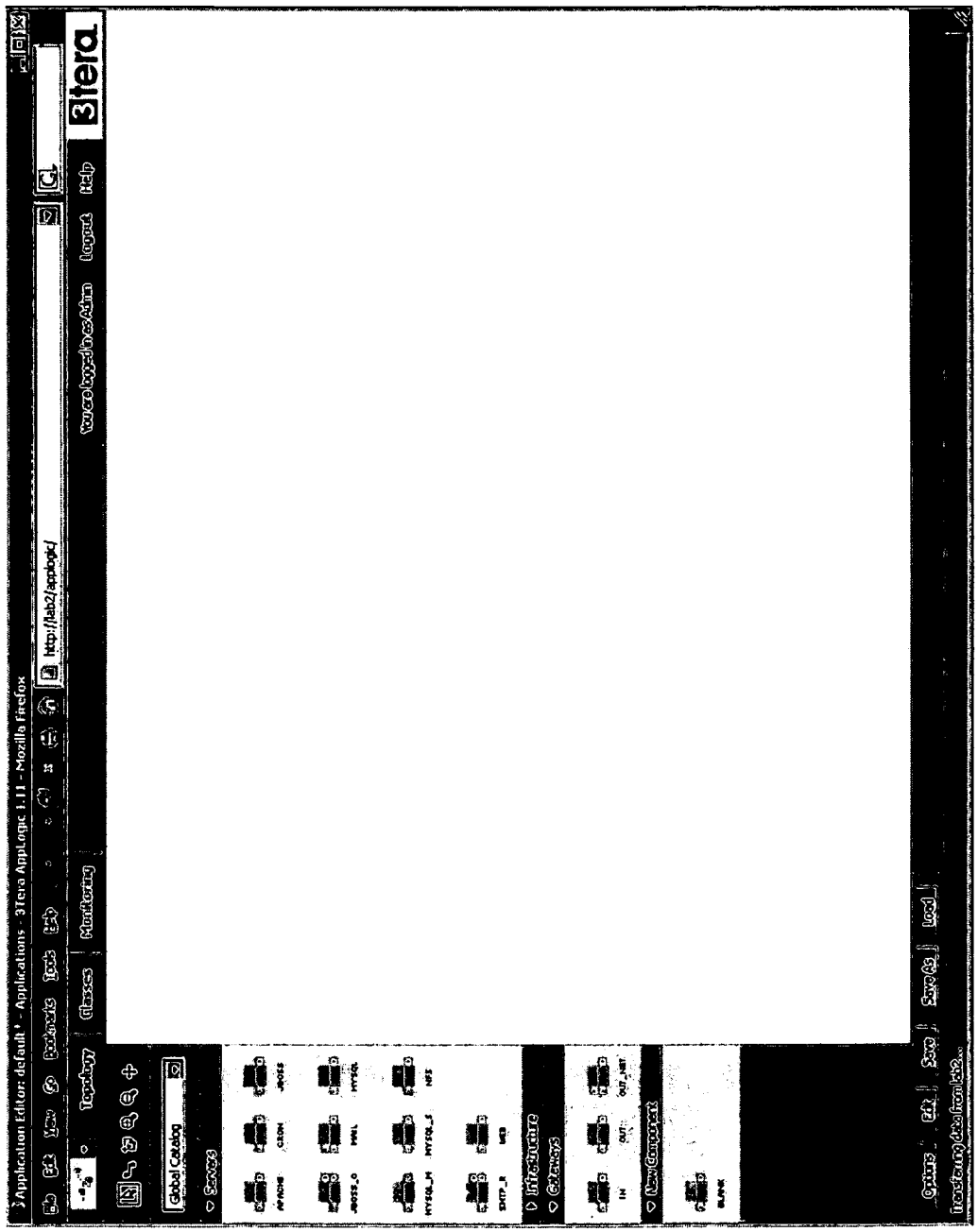
FIG. 13 illustrates the preferred user interface of the visual editor.

FIG. 13 illustrates the preferred design and elements of the application editor. The editor is preferably implemented as a web-browser based user interface, allowing access to the editing functionality from any workstation having network connection to the inventive system.

Even though the editor preferably operates in a browser, its user interface preferably looks, feels and behaves as a desktop windowed application. The visual layout and behavior of its user interface is preferably similar to stencil-and-canvas drawing tools, similar to Microsoft Visio, Kivio for Linux, Corel Draw, and others, and is further specialized to easily draw and connect structures of components with terminals.

Figure 20:
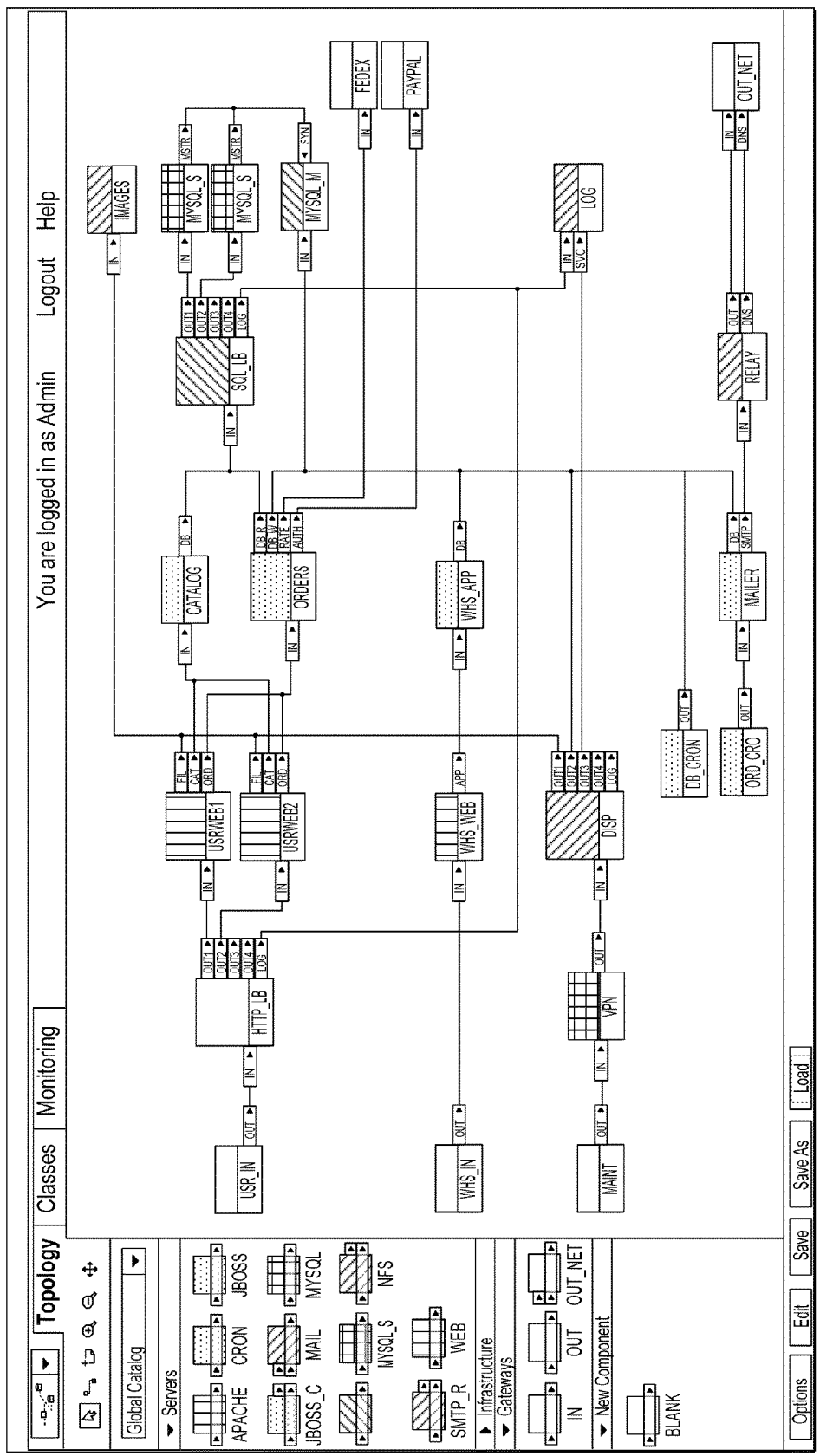
FIG. 20 illustrates an application assembled using the inventive method.

FIG. 20 illustrates the application editor with a distributed e-commerce application displayed on the canvas. The property sheet screens and behavior of the editor are preferably similar to most desktop windowed applications, such as Microsoft Windows Explorer property sheets and follow similar visual design guidelines.

At user's option, different scopes (i.e., composite appliances) of the application can be either opened in different browser windows or may replace the content in the same window. The editor preferably supports both visualization options.

Most operations in the editor are preferably implemented so that they can be applied to a single component or to a selected set that contains multiple components. Such operations preferably include at least drag and move on the canvas; cut, copy and delete; and modifications achieved through property sheets.

The windows displayed by the editor have titles that preferably contain the name of the component being edited, the type of editor and the name of the application. It is also preferable that the editor performs basic file locking on descriptor files on which it presently operates, similar to the locking schemas employed typically by text editors, such as the "vi" editor in Linux. This allows multiple users to safely view and/or edit one and the same application.

The editor preferably does not save any modifications to the application made by the user until the user explicitly chooses a "save" operation. If, while navigating through the application, the user tries to close a window or navigate away from the modified component, and changes would be lost, the editor preferably prompts the user, giving him an option to save or discard the changes.

The editor preferably implements a different screen for each type of entity being edited. These screens preferably include: a list of available applications, a virtual appliance editor, a composite appliance boundary editor and an assembly (interior) editor. In addition, the editor preferably allows visual operations between entities, such as dragging virtual appliances from a catalog onto the application canvas and vice-versa.

The Application List

The application list is preferably the first screen that the user sees after logging in. This screen preferably contains the list of applications available for editing and provides the ability to select and open for editing or viewing one of these applications. In addition, the screen preferably provides ability to execute certain actions over whole applications, such as creating a new application, deleting a whole application, renaming an application, etc.

Each entry in the application list preferably includes the name of the application, a human-readable description and a unique identifier.

The Virtual Appliance Editor

Figure 15:
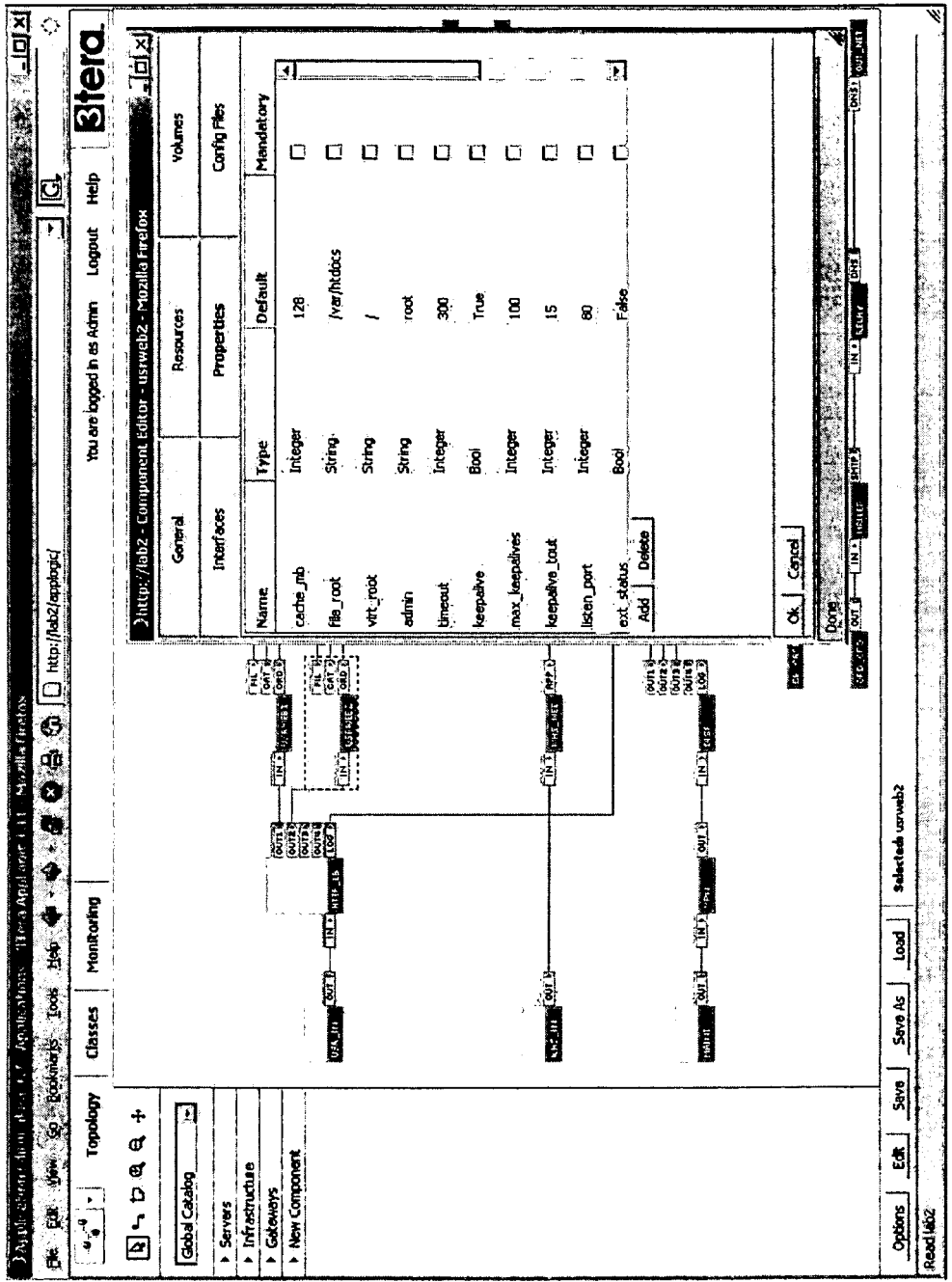
FIG. 15 illustrates the preferred user interface for defining virtual appliances.

The virtual appliance editor (also known as the component editor) is preferably a property sheet window for editing virtual appliance classes. All information available in this editor is obtained from and stored in the component descriptor file of the edited virtual appliance class. The appearance of the editor is preferably distinctly different from other property sheets, especially from the instance settings property sheet of the assembly editor. FIG. 15 illustrates the preferred visual interface of the virtual appliance editor.

The virtual appliance editor preferably always displays a preview of the appliance's graphical shape, showing the correct size and color, as well as the terminals, their names and positions. It is preferred that the editor opens in read-only mode for all appliance classes except singletons included directly in the application package.

The virtual appliance editor preferably comprises the following sections, with each section implemented as a separate property sheet tab: a general section, an interfaces section, a volumes section, a resources section, a properties section and a configuration files section.

The general tab preferably contains common class attributes, as well as some visual attributes. An example of the fields available through this section includes the class name, a description, operating system type, whether instances of this class can be migrated live from one server to another, as well as visual shape, size and color.

The interfaces tab preferably allows the user to view, edit and create the set of virtual appliance interfaces, including both terminals and virtual network adapters. It preferably displays a list of terminals showing, for each terminal, its name, direction (input or output), communication protocol for connections on that terminal and a "mandatory" attribute that defines whether the terminal must be connected in order for the appliance to operate. For "raw" virtual network adapters—those that are not associated with a terminal—the editor may allow defining and editing the MAC address.

Using the interfaces tab, the users can add, delete or rename terminals in the list. The terminal's position, such as the side of the component's shape on which the terminal appears, and its order among other terminals on that side, are preferably editable as well. The editor preferably allows the user to insert gaps between terminals, so that terminals can be visually grouped, as convenient.

The volumes tab preferably defines the set of volumes to be used by instances of the virtual appliance class being edited. The list includes both class volumes, which are to be instantiated with the appliance, and placeholders for application volumes, which are to be parameterized on each instance of the appliance. For each volume, the editor preferably allows the user to define a logical name that determines the role of the volume within the appliance, a mount path under which this volume will be visible to the software inside of the appliance, and a boot attribute defining whether this volume is the boot volume for the appliance. The user can add, delete and rename volumes in the volume list.

In addition, the volumes tab preferably allows the user to define a variety of attributes for each volume. Such attributes may include class vs. placeholder, a "mandatory" attribute for placeholders that defines whether the appliance must be parameterized with a valid volume in order to operate. In addition, the editor preferably makes it possible to restrict the access of the appliance instances to a given volume to read-only access, as well as to express constraints, such as "high-bandwidth access" and "local access only" that allow the inventive system to optimize the placement of the volumes and virtual machines that comprise appliance instances.

The resources tab preferably allows the user to set minimum and maximum values for each hardware resource required to execute an instance of the virtual appliance. Such resources include at least CPU time, memory size and network bandwidth. The system can use these values to ensure that sufficient resources are available for each virtual appliance instance, as well as to prevent any particular instance from depriving the rest of the executing instances of any particular resource.

The property tab preferably allows the user to define, view and edit the list of properties made available on each instance of the edited virtual appliance class. It preferably contains a list of properties, specifying for each property its name, data type, whether setting this property is mandatory on each instance, a default value, and optionally, constraints, such as range for integer properties, maximum length for strings, and enumerated list of allowed values. The user can add, delete and rename properties on the list, as well as edit any of the attributes of each property.

The configuration files tab preferably lists the set of configuration files contained within the virtual appliance to which property values are to be applied at instantiation. For each configuration file, the tab preferably includes the logical name of the volume (as defined in the volumes tab) on which the file is to be found, the path of the file relative to the specified volume, and additional information, if needed, such as special character escaping rules for that file. The user preferably can add and delete configuration files, and edit the information for each file.

The Composite Appliance Boundary Editor

The boundary editor is preferably a property sheet that allows the user to define the boundary and other elements of a composite appliance that are not related to appliance's interior structure. This editor is visually and semantically similar to the virtual appliance editor, except that it operates on composite appliances.

The editor preferably operates in read-only mode for all classes except singletons included directly in the application package, and is preferably divided into several sections (tabs).

The general tab contains common class attributes, as well as visual attributes. Those preferably include the class name, a description, shape color, size and style.

The terminals tab preferably allows the user to view, define and edit the set of terminals exposed on the boundary of the composite appliance. It preferably contains a list of terminals, including, for each terminal, its name, direction (input or output), and a "mandatory" attribute. The user can add, delete and rename terminals, as well as edit the data related to each terminal. The terminal's visual position on the appliance shape, such as side and order of terminals, can be edited as well; gap insertion is preferably supported if it is supported for virtual appliances.

The properties tab preferably allows the user to define the set of properties that is to be exposed on the boundary of the composite appliance. It preferably includes a list of properties, defining, for each property, name, default value and an optional "mandatory" attribute. The user can add, delete and rename properties, as well as edit data related to each property.

The volumes tab allows the user to define a set of volume placeholders that can be configured with references to application volumes on the boundary of the instances of the edited composite appliance class. For each volume placeholder, the tab preferably provides name, an optional "mandatory" attribute, as well as other attributes, such as shared or read-only. As in other tabs of this editor, the user can add, rename, delete or edit list elements.

The Assembly Editor

The assembly editor is the main screen of the application editor. It allows users to view and edit the interior structures of composite appliances. This includes adding or removing subordinate instances, configuring each of those instances, and creating the structure by interconnecting their terminals. In addition, the assembly editor preferably supports the ability to customize virtual appliance classes in a convenient visual way. To achieve these functions, the assembly editor preferably provides the means for opening the other editors, such as the virtual appliance editor, the boundary editor, etc.

FIG. 20 illustrates the preferred visual design and elements of the assembly editor with an e-commerce application being edited in it. The assembly editor provides a drawing canvas on which appliance instances, virtual or composite, are configured and assembled into structures. The editor preferably includes one or more palettes that make it possible to select the classes of virtual appliances to be included in the structure from a catalog, recycle bin, etc.

To create an instance, the user preferably selects an appliance class from a palette and drats it onto the canvas. If the selected class is a virtual or composite appliance, the editor will create an instance of that class. If a special "blank" class is selected, the editor will preferably create a new singleton class and place it directly in the application package; as well as create an instance of this class. In addition, the editor will generate automatically a name for the instance and/or, optionally, for the singleton, so that the name is unique within the structure being edited.

The editor preferably displays each instance as a rectangular shape with attached terminals. The color, style and size of the shape, as well as the positions of the terminals, are as specified when defining the virtual appliance class to which this instance belongs.

For each instance, the editor preferably displays the class name within the body of the instance, the instance name outside of the body, the name and direction of each terminal within the terminal, and zero or more selected attributes that apply to this appliance.

Once an instance is created on the canvas, the editor allows the user to drag it freely around the canvas, changing its position, and preferably preventing the user from placing it directly over another instance.

Figure 16:
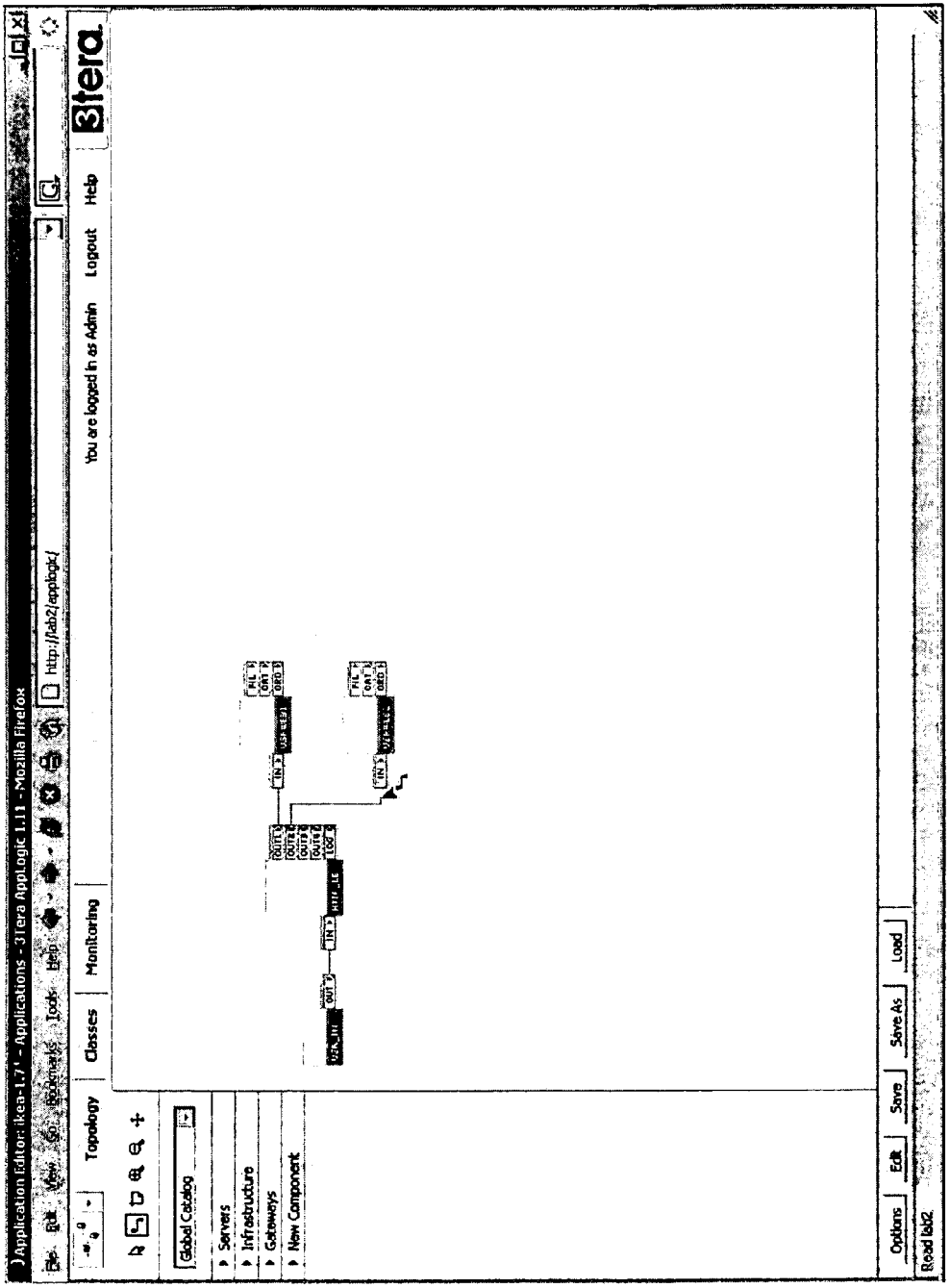
FIG. 16 illustrates the preferred user interface for connecting appliance instances.

The terminals of the instance can be connected by preferably clicking on one of the terminals and dragging a connection to the other terminal. FIG. 16 illustrates the preferred method for connecting terminals. The editor preferably allows output terminals to be connected only to input terminals and input terminals only to output terminals. Each output is preferably connected to only one input, while many outputs can be connected to the same input.

Whenever multiple outputs are connected to the same input, the resulting connections are preferably joined visually as close to the outputs as possible to prevent clutter.

The editor routes connections automatically by default, and preferably allows the user to re-route any connection manually by dragging moveable lines and corners of connections, and by adding or deleting line segments.

The editor allows the user to select one or more instances and apply various operations to them. Whenever a selected instance or group is moved, their connections are preserved as much as possible; this includes preserving all connections between the selected instances, and re-routing any connections from a selected instance to a non-selected instance.

Figure 17:
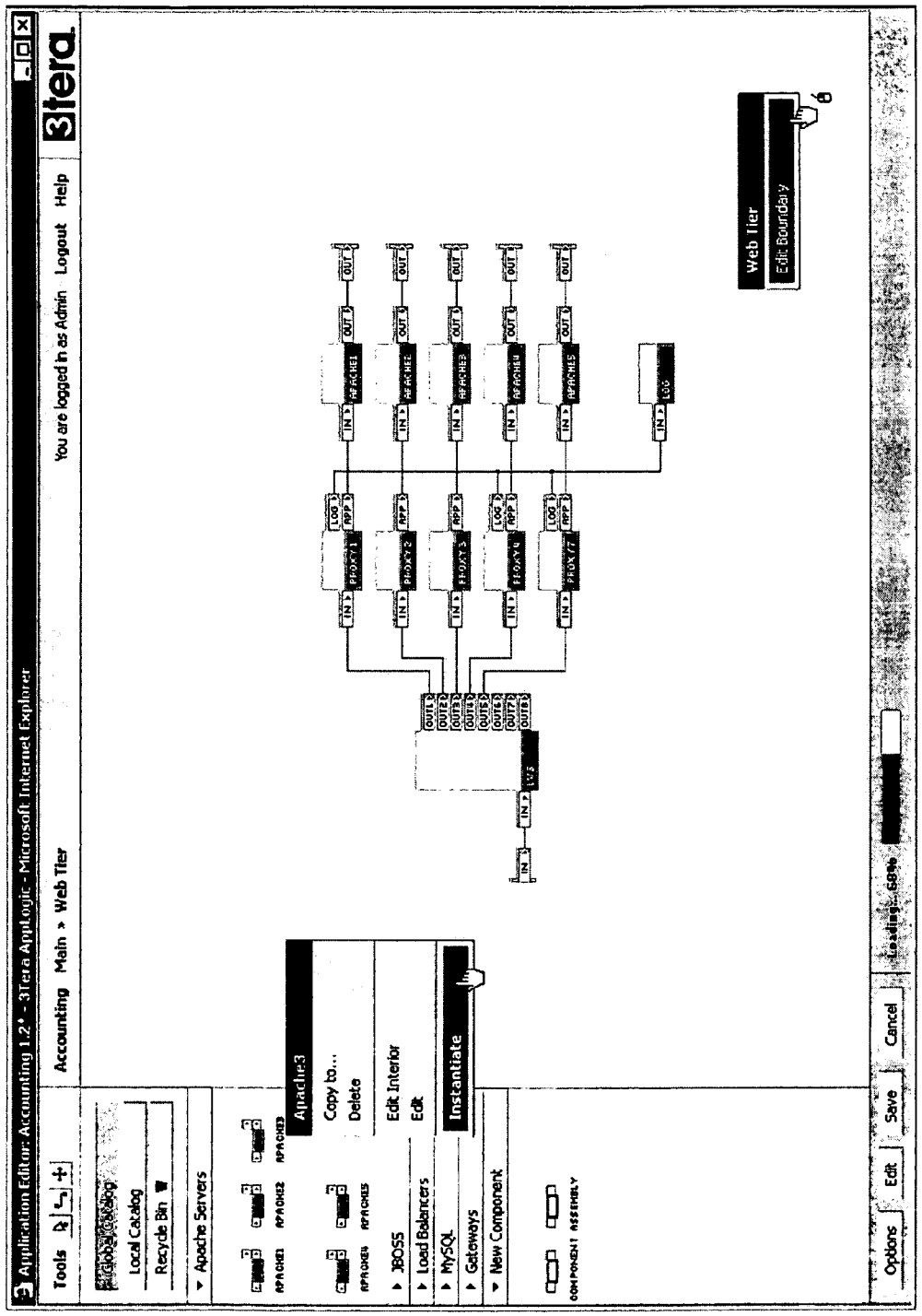
FIG. 17 illustrates the interior of a composite appliance in the editor.

FIG. 17 illustrates the interior of a composite appliance "Web Tier" opened in the assembly editor. Note that the terminals of the composite appliance are visualized on the canvas as small, pseudo-appliances, with one terminal each, indicating the name and direction of the respective terminal, and can be connected to the interior structure.

In addition to instances, terminals and connections, the user can preferably add text box annotations on any place on the canvas. The editor will preserve such annotations as comments in the structure describing the appliance interior.

The editor preferably allows the following operations over selected appliance instances: cut, copy, paste, view/edit class boundary, view/edit class interior (for composite appliances), configure instance, and branch class. Those operations are preferably selected by a right-button click on the instance shape, which opens a context menu and selecting the desired operation from the menu. The semantics of the cut, copy and paste operations are the same as in any windowed editor; viewing class boundaries and/or interiors is accomplished by starting the appropriate editor over the class of the selected instance. Configuring instances is accomplished by displaying a special instance settings property sheet that is preferably part of the assembly editor and displays and modifies data within the same structure descriptor.

Catalog Palettes

The visual editor preferably provides a set of palettes, one for each catalog made available to the user. The user is preferably able to select a subset of catalogs to be displayed at any time. Each palette displays an icon for each appliance class found in the respective catalog, with the icon visually resembling the shape of the component as much as possible. The icons displayed are preferably grouped by category of appliance they represent, such as servers, infrastructure, gateways, load balancers, etc.

Dragging an icon from the catalog onto the canvas preferably has the effect of including a new instance of the selected class into the edited structure. Dragging a special "blank" appliance or a "blank" composite appliance from the palette preferably creates a singleton class included directly in the application package, and an instance of this class included into the edited structure.

A right-button mouse click on an icon in the catalog preferably opens a menu that gives the user options, such as deleting or renaming the class, creating an instance of the class (same as drag to canvas), copying the class, moving the class to another catalog or converting it to a singleton, viewing the appliance boundary and interior (if the appliance is a composite). In addition, double-clicking on an appliance icon in the catalog palette preferably opens up the respective editor to display detailed boundary information about that class.

Class Branching

Branching a class involves creating a copy of the class of the selected instance, designating such copy as a singleton class, placing the singleton class directly in the application package, and changing the class of the selected instance to the new singleton class. Branching creates a tightly coupled pair comprising an instance and a singleton class, which can be edited as single entity.

Adding a Class to a Catalog

To add a new class to a catalog, the user preferably converts a singleton into a class. To do this, the user selects the instance of the singleton on the canvas and drags it into the desired catalog's palette. The editor then creates the appropriate class within the catalog structure, copies and/or moves all class data and volumes into the catalog, and preferably deletes the singleton. In addition, the instance that was selected to initiate the operation is preferably removed from the structure.

Instance Settings

The instance settings property sheet allows users to configure a subordinate instance in a structure of virtual appliances. Unlike in appliance and boundary editors, in which changes apply to the all future instances of the edited class, instance settings apply only to the selected instance. Instance settings override any default values specified in the class.

In any place within the instance settings property sheet where the user is expected to input a specific value, the editor allows the user to specify a "reference" to a property of the composite that contains that instance. If such reference is specified, the system will substitute it at the appropriate time with a value assigned directly or indirectly to the respective property of the composite. This makes it possible to "redirect" a property, attribute or volume of the composite instance to one or more properties, attributes or volumes of its subordinate appliances.

The instance settings are preferably divided into several sections (tabs).

The attributes tab contains the instance name, as well as a set of attributes that apply to that instance. The tab preferably includes the class name and may include optional attributes, such as a start order, migrateable, standby, etc.

The resources tab preferably makes it possible to override the resource constraints specified in the class of the virtual appliance to further reduce the range of resources available to the particular instance, if desirable.

Figure 18:
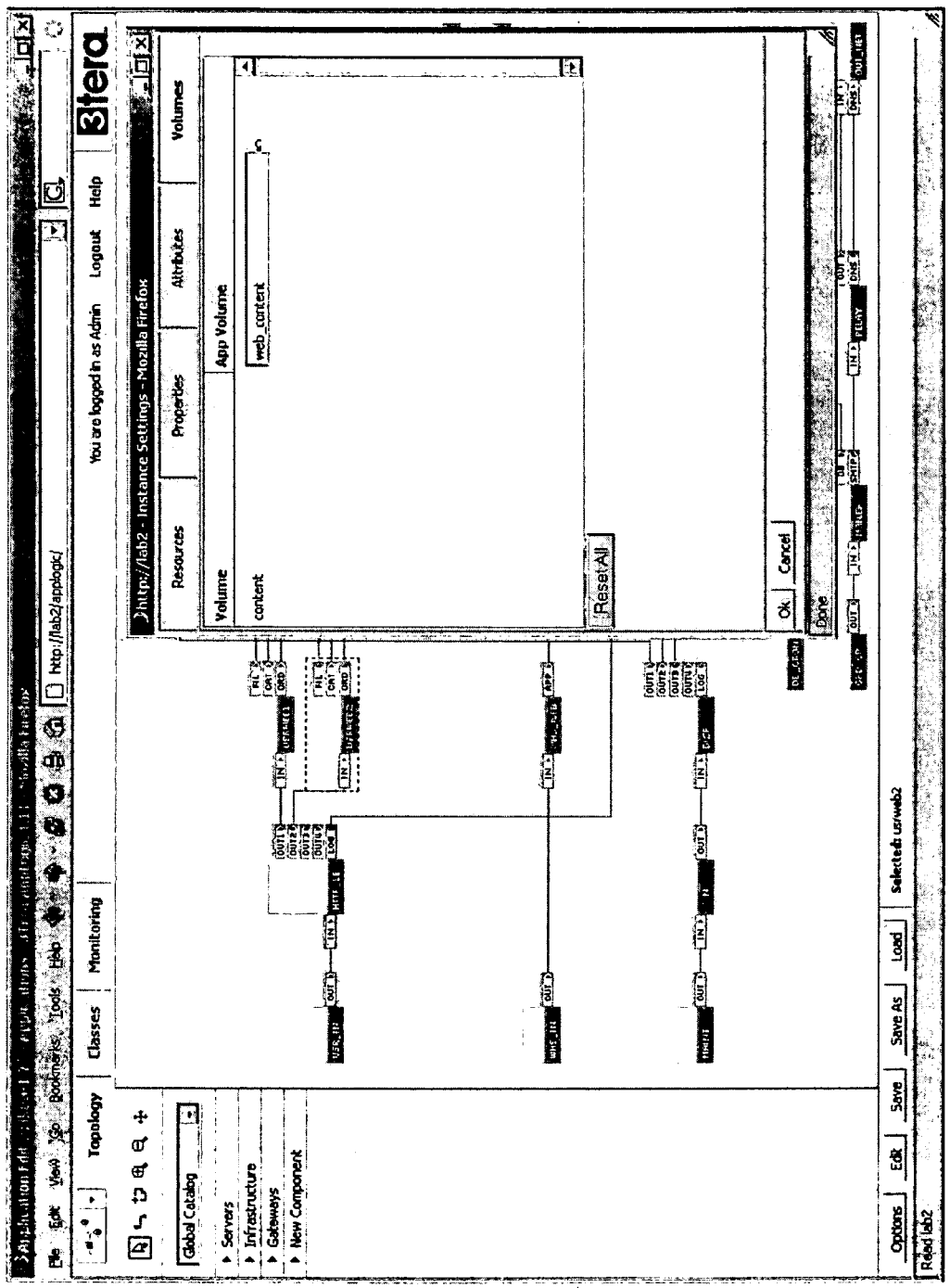
FIG. 18 illustrates the preferred user interface for setting volumes on instances.

FIG. 18 illustrates the preferred design of the instance settings volumes tab. It allows the user to configure the instance, so that it can access a specific application volume. To achieve this, the instance is preferably configured with the name of the desired application volume.

Figure 19:
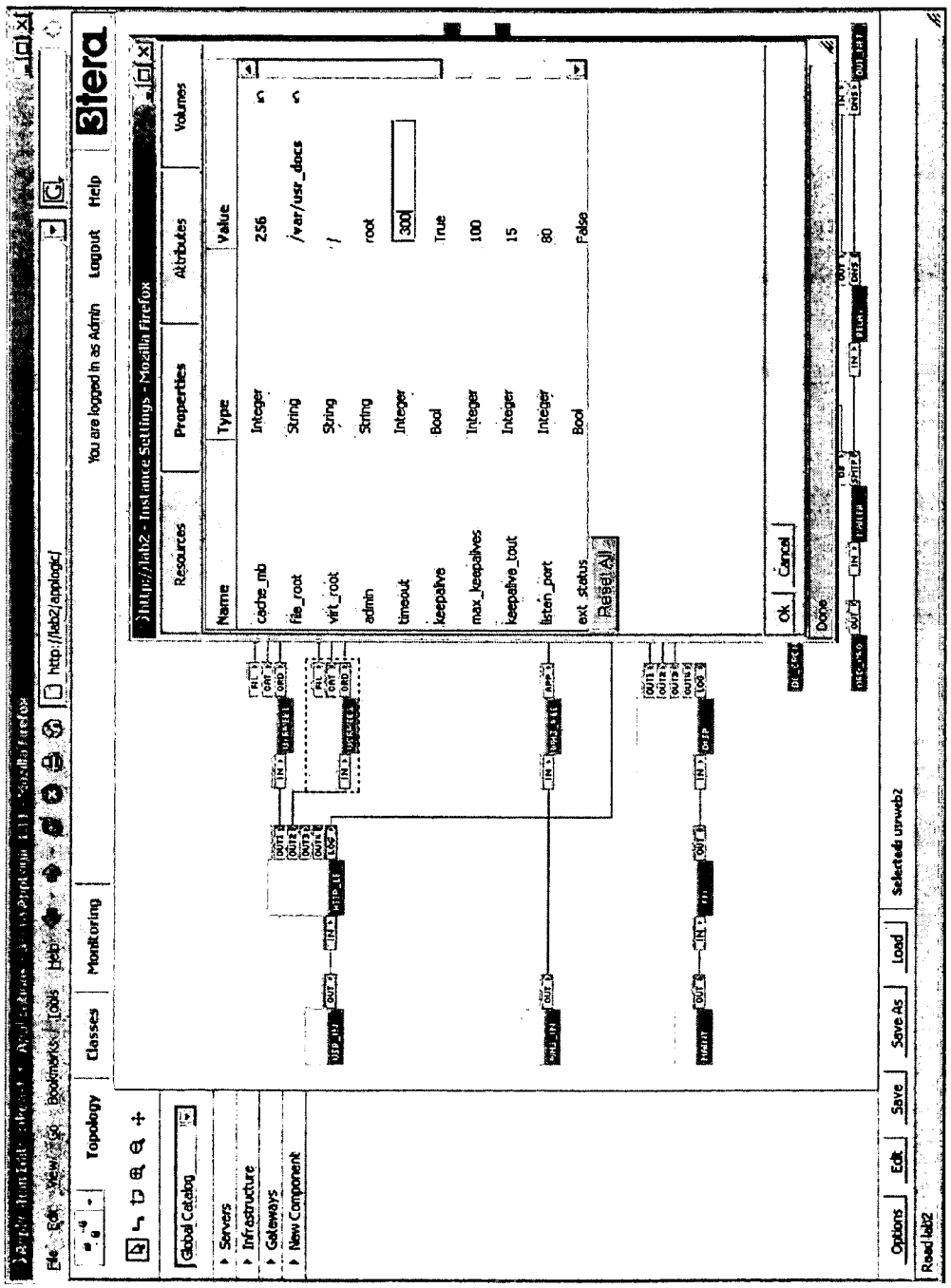
FIG. 19 illustrates the preferred user interface for setting property values on instances.

FIG. 19 illustrates the preferred design of the instance settings properties tab. It allows the user to set property values that configure and specialize the instance for its role within the structure. For each property defined on the class, the user may view the default value, if any, and override it if desired. In addition, the user may select one or more properties and their values to be displayed by the editor in the vicinity of the instance's shape on the canvas, thereby improving the readability of the diagram.

Application Configuration

In addition to editing various sub-entities within the application, the visual editor preferably allows users to define application-level configuration parameters that can be used to modify the behavior of the application as a whole, bind it to a particular hardware configuration, etc.

The application configuration property sheet is preferably divided into several sections (tabs).

The general tab describes the application as a whole, including name, version, human-readable description, comments, unique ID, etc.

The application resources tab defines a subset of the hardware resources within the inventive system that are to be assigned to the given application. The tab preferably contains two general groups of fields, one for hardware resources, and the other for IP network settings.

Hardware resources are preferably specified in terms of number of CPUs, total amount of memory and bandwidth to be committed to the application. In some embodiments of the system, it may be preferable to specify the hardware resources in an alternative fashion, such as total number of servers assigned to the application or a list of specific servers designated to run it.

The IP network settings group preferably defines the range of IP addresses to be allocated for internal use by the inventive system when running this application.

The property tab is preferably similar to the instance settings property tab discussed above, and makes it possible to configure the application as a whole in a manner similar to configuring any other composite appliance.

The application volumes tab preferably enables the user to create and manage a set of application volumes associated with the given application, assign their names and sizes, and configure the application in using them. The user can add, rename and delete volumes; and assign reference to volumes to volume placeholders exposed on the boundary of the application in a manner preferably similar to configuring any other composite appliance.

3. The Visual Method

The present invention teaches a visual method for rapid design, construction and deployment of distributed applications using the application model and visual interface described herein. In this section, we will discuss in more detail the basic steps required for practicing this method. Those steps comprise creating a virtual appliance, assembling a composite appliance from existing appliances, creating a new appliance class in a catalog and creating the application. In addition, this section covers related topics such as troubleshooting applications designed with the inventive system and monitoring their execution.

Creating a Virtual Appliance

To create a new virtual appliance using the inventive system the user preferably opens the application editor and drags a blank virtual appliance onto the editor canvas. This creates a new, automatically named singleton class and an instance of that class. The user then selects the new instance and opens the virtual appliance editor on its class.

Using the virtual appliance editor, the user defines the new virtual appliance by specifying appropriate class name, and a set of properties, terminals, interfaces and volumes, In addition, the user selects appropriate values for hardware resources, properties and execution attributes that will be used as defaults for new instances of this class.

Through the application settings screen, the user creates one or more application volumes that will be later used as class volumes for the new virtual appliance and then installs or copies the desired combination of operating system, add-on software packages and configuration data for the appliance. The user further configures the various software packages that must operate together inside the appliance in accordance with their documentation. In addition, the user selects configuration files and parameters within them that are to be exposed for configuring the virtual appliance and maps them to properties using one of the property mechanism methods described herein.

Further, the user configures the software packages within the appliance to use the names of the terminals defined on the boundary of the appliance. If the appliance does not have multiple input terminals with the same protocol, the software within the appliance is configured to listen for incoming network sessions in the conventional way (e.g., by port number only). If two or more input terminals are defined with the same protocol, for each such terminal, the user has to configure the software so that it will listen for network sessions using the name of the desired terminal as a network host name.

For output terminals, the user configures the appropriate software packages as if the name of the respective output terminal was the name of a remote network host to which the package is expected to establish a communication session.

Once configured, the volumes are bound to the appliance being created by opening the instance settings property sheet on the appliance instance and configuring each volume placeholder with the name of its respective application volume.

Creating a Composite Appliance

To create a composite appliance, the user drags a blank composite appliance onto the editor canvas, thereby creating a singleton composite class with an automatically generated name and an instance of that class. The user then selects the newly created instance and opens the boundary editor on its class.

Using the boundary editor, the user defines the new class by selecting an appropriate name for it, and defining its terminals, properties and volume placeholders, as desired.

The user then proceeds to edit the interior of the new class, by selecting the instance and choosing the "edit interior" option from the context menu. A new editor window opens providing a canvas for defining the interior, on which the terminals of the composite have already been placed.

The user creates the desired structure, by: (a) adding appliance instances by selecting appropriate appliance classes from a catalog and dragging them on the canvas, (b) configuring each instance through the instance settings property sheet, and (c) connecting the terminals of the instances and the terminals of the composite into the desired structure. Note that within the interior, an input terminal of the composite behaves as an output (i.e., it is connectable to exactly one input of a subordinate appliance), and an output terminal of the composite behaves as an input (i.e., multiple outputs of various subordinates may be connected to it).

Wherever desired, the user redirects properties and/or volumes of the composite to properties and/or volumes of one or more subordinates, by referencing them in configuration of the instance settings of the subordinates as described above.

Creating a Catalog Class

Once a virtual appliance or a composite appliance is created on the canvas, it can be dragged onto one of the available catalogs to create a catalog class from which multiple instances can be created. The act of dragging the appliance onto the catalog converts the singleton into an identically named catalog class, includes that class in the package of the desired catalog, and deletes the instance used to create and edit the new appliance.

In the process of creating a new catalog class, application volumes that are configured as class volumes of the new class, are converted into instantiable class volumes by the inventive system and removed from the list of application volumes accessible by the user.

Creating an Application

The inventive system preferably implements an application as a combination of a package descriptor, a singleton composite appliance named "MAIN", and an optional catalog. Assuming that all required appliance classes already exist in one or more available catalogs, assembling the application is equivalent to creating the interior of the MAIN composite.

The MAIN composite preferably has no terminals, since the application is expected to interact with the rest of the computer network through one or more virtual network adapters defined on one or more instances of virtual appliances included in the application. Such interactions are preferably carried out by means of standardized input and output "gateway" appliances, thereby isolating most of the application from having to know the details and settings of such interactions.

The act of creating an application in general comprises an iterative process that combines top-down decomposition of the desired functionality into subsystems, which are expressed as composite appliances, with the bottom-up assembly of subsystems and other composites from available appliance classes. In the process, it may be discovered that creating a new virtual appliance class is required to best express a sub-function of a given subsystem; in this case the appropriate class is created either from scratch or, more often, by branching and customizing an existing appliance class.

The design of the new application is complete when the MAIN singleton is fully assembled and all subordinates included in it exist and are properly configured. As soon as this stage is achieved, the application is immediately ready for execution on a target hardware system: the set of descriptors and volumes that comprises the application designed as the present invention teaches contains all necessary software packages, data, configuration parameters and structural information required to create a running instance of the application under the control of the inventive system.

It is important to realize that the user does not have to wait until the target application is fully elaborated before running it: any subset of the application, being it a single virtual appliance, an incomplete structure of virtual appliances, a finished application subsystem such as a database cluster or a web tier, or an application that is not completely configured, can be started on the inventive system subject only to the software packages included in the existing virtual appliances having sufficient configuration and connectivity to operate.

Considering that the application is a hierarchical structure of composite appliances and is itself a composite appliance, it is beneficial to design the application so that any properties, volumes or attributes that may be desired to change when deploying the application on different systems and locations, are exposed as properties, volumes and attributes of the application (i.e., of the MAIN composite). This makes the whole application, no matter how large and complex, configurable and deployable as easy as a single virtual appliance.

Troubleshooting and Monitoring

When executing an application built using the present invention the inventive system constructs the running image of the application from virtual resources, using structural and configuration information captured in virtual appliances and composites. This way of deploying and executing applications has a significant added benefit in that all structural information captured throughout design and development is available to the system at run time. This makes it easy to correlate monitoring data captured as the application runs with the logical structure of the application, and significantly simplifies the process of troubleshooting and tuning applications and monitoring the execution in production by making it intuitive.

Figure 21:
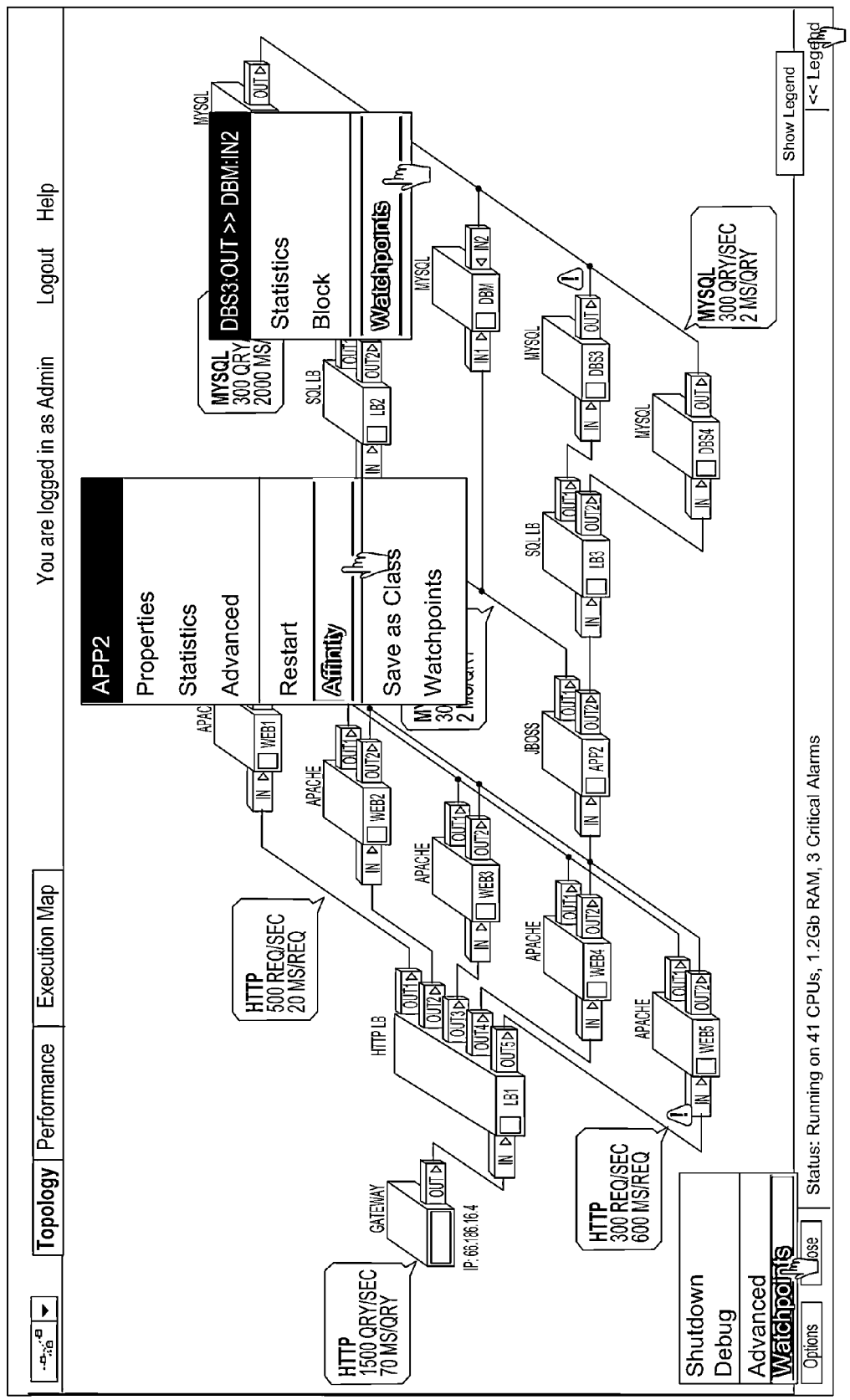
FIG. 21 illustrates the preferred user interface for application monitoring.

FIG. 21 illustrates the monitoring and troubleshooting user interface in the preferred embodiment. Typically, each virtual appliance is dedicated to serving a particular function within the application; monitoring the resource usage of the appliance, such as CPU load, memory and bandwidth, provides an excellent indication about the operation of that function. Similarly, it is easy to design virtual appliances so that each terminal represents a distinct incoming or outgoing logical interaction; the result of such design being that most, if not all, connections within the application structure represent distinct logical interactions between different functions in the application. Since each terminal is preferably constrained to a specific connection and protocol type, it is easy to interpret the traffic along any connection to determine key characteristics such as requests per second and response time per request. All of this monitoring data pertains to individual virtual appliances, connections or terminals, and can be easily overlaid on the visual layout of the application structure. As a result, the inventive system presents the user with a live view of the application design, reflecting the state, the load and communication patterns of the application as they develop.

The inventive system also provides easy means to define thresholds of normal behavior on appliance instances and connections, and detect and display abnormal behaviors on the visual layout of the application. This enables the user to formulate and execute corrective actions directly in the terms of the application logic rather than having to continuously translate such actions into the terms of the physical infrastructure on which the application executes.

Change Management and Version Control

One of the problems that is exceedingly difficult to resolve within the prior art systems is the ability to capture and manage the full set of configuration and other changes affected on a running application, the effect of which is that the user is often unable to roll back to a "last known good" state of the application. This problem becomes especially acute when the application is large enough to require multiple people to administer, tune and troubleshoot the system. The existing approach to solving this problem is to introduce restrictive processes and complex change management systems which often aggravate the situation by adding significant complexity.

The present invention enables a simple and effective approach to change management in distributed applications by making it possible to apply technology that is well understood and proven over decades of use to the problem. The inventive system captures the complete structure and configuration of the application, including installed images of operating systems, application software, configuration files, network settings, scripts and user data, sufficient to execute the application on any instance of the inventive system, and retains this data in the form of collection of text files (descriptors) and logical volume images. This makes it possible to use a commercial version control system developed for use in software code development, such as ClearCase or Microsoft Visual SourceSafe, to effectively implement version control of distributed applications during design and development, as well as for change management in the later stages of application delivery and deployment.

Summary

The disclosed visual method makes it possible to construct distributed applications of arbitrary complexity by visually defining a model of the target application that is simple and yet sufficiently complete to allow the inventive system to deploy and execute the application on a variety of target hardware without any further human intervention. This greatly simplifies all activities related to designing, constructing, deploying and managing large distributed applications by eliminating the need for constant manual translation from application logic to hardware configuration and vice-versa.

3. The System

The present invention includes a system that implements the necessary support for the abstractions defined in the application model and for practicing the visual method. In addition, the system provides runtime support for deploying, executing, monitoring and managing applications constructed as the present invention teaches.

Architecture

Figure 22:
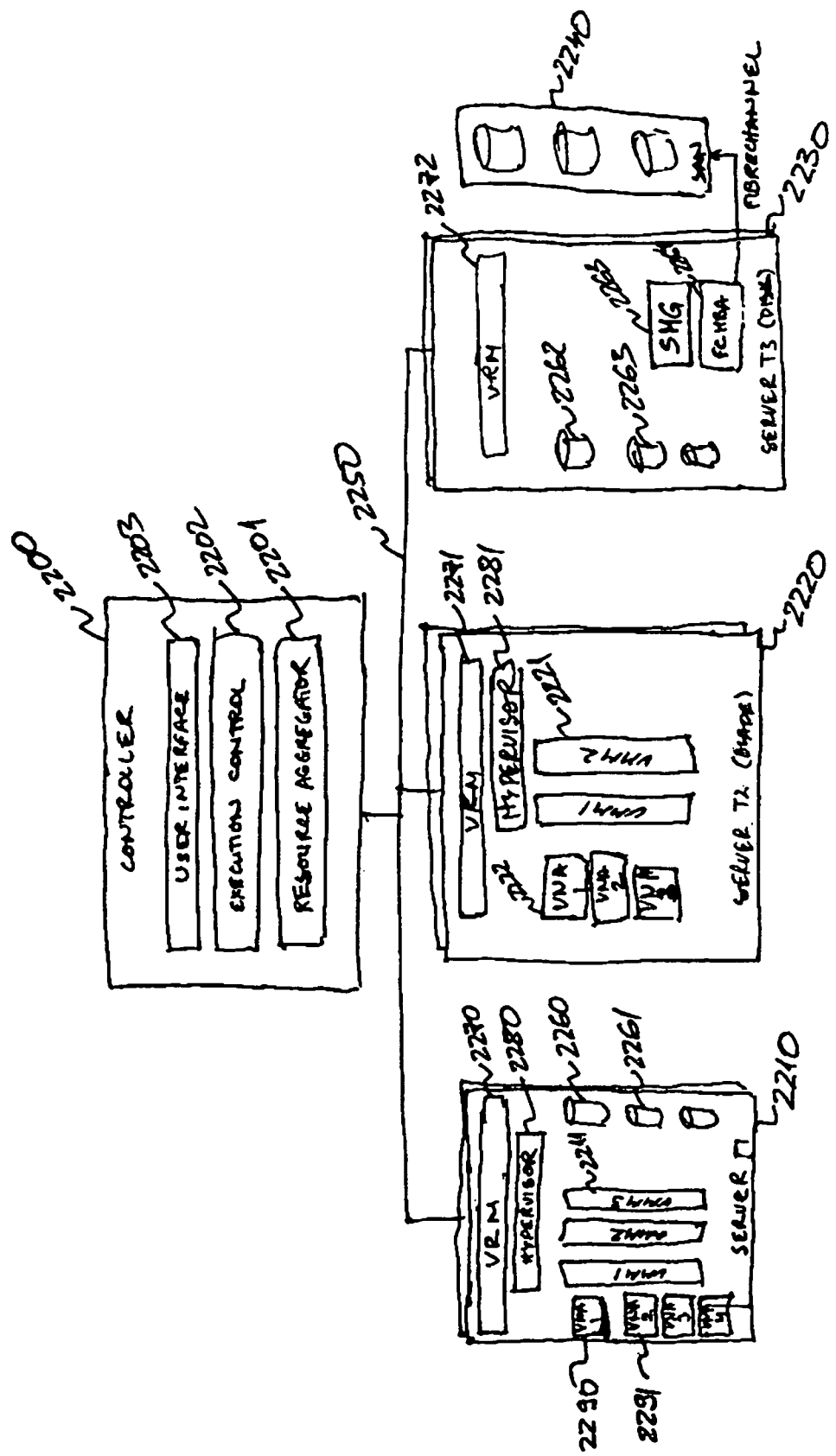
FIG. 22 illustrates the system architecture of the preferred embodiment.

FIG. 22 illustrates the architecture of the inventive system. The system comprises a system controller 2200 and one or more servers 2210 and/or one or more server blades 2220. In addition, the system may include a storage area network (SAN) 2240, in which case one or more of the servers, such as the servers 2230 would act as gateways providing access to the SAN 2240 for the rest of the system. All nodes in the system are interconnected through the network 2250 which is assumed to have sufficient bandwidth to carry the operation of the system. The servers 2210 may have hard disks or other storage media attached to them, while the server blades 2220 may be diskless.

In another embodiment of the present invention, all elements of the inventive system reside on a single server such as 2210, and use the storage attached directly to the server.

Servers 2210 and blades 2220 are configured to boot a suitable host operating system and a virtual machine manager 2280 or 2281, which enables them to be partitioned into multiple virtual machines 2211. In addition, those servers are configured to execute a virtual resource manager 2270 or 2271, which interacts with the controller 2200. The inventive virtual resource manager implements support for virtual network interfaces 2290 and 2291, and for virtual storage volumes 2260 and 2261, sufficient to implement the application model. In addition, each virtual resource manager 2270 controls its local virtual machine manager 2280 and extends its functionality as may be necessary to provide sufficient support for the application model.

In the configuration shown for the server 2210, the virtual resource manager 2270 makes the hardware resources of the server available to the controller 2200 as three distinct pools of virtual resources, including virtual machines 2211, virtual network interfaces 2290 and virtual volumes 2260. The server blade 2220 has no storage and so the virtual resource manager 2271 is configured to make its resources available to the controller 2200 as two pools of virtual resources: virtual machines 2221 and virtual network interfaces 2222.

Unlike servers 2210 and blades 2220, the servers 2230 are configured to provide access only to the storage resources of the SAN 2240. Accordingly, they do not have a virtual machine manager and their local virtual resource manager 2272 interfaces with a suitable SAN management system 2263 to provide a pool of virtual volumes 2260 and 2263 which are physically located on the SAN 2240 and accessed via a FibreChannel interface 2264.

The controller 2200 can access all servers 2210, 2220 and 2230 over the network 2250 and can, therefore, create, control and access virtual machines, virtual volumes and virtual network interfaces, as applicable, on any and all of the above servers. The controller includes a resource aggregator 2201, an execution control module 2201 and a user interface system 2203.

The resource aggregator 2201 provides unified access to the virtual resources exposed by the servers 2210, 2220 and 2230, creating thereby three uniform distributed and scalable pools of virtual resources, one for each type of resource. The resource aggregator preferably abstracts the actual location (e.g., server) on which each instance of a virtual resource resides from the rest of the controller, and also preferably manages the creation of such resources, determining on which server to create each particular resource instance and interacting with that server to this purpose.

The execution control module 2202 uses the resource aggregator 2201 to create, access and manage virtual resources. It provides runtime support for the application model allowing virtual appliances to be instantiated, configured, interconnected, started, executed, migrated from one server to another and monitored. In addition, the execution control module provides the necessary support for composite appliances and applications.

During the execution of an application, the execution control module 2202 may further interface with external software, making such application available for management by conventional data center management software, and forwarding alerts and other events related to the running application to such software.

The user interface system 2203 has two key functions: (a) it implements command line and visual interface to the execution control module and the rest of the inventive system, and (b) it implements the visual user interface (editors) for practicing the method taught by the present invention.

Adding and Removing Servers

In the preferred embodiment of the inventive system, the servers such as 2210, 2220 and 2230, are configured to boot through the network, for example by using a Pre-boot Execution Environment (PXE) module, and the controller 2200 is configured as a boot server. When a new server is added to the system, it is connected to the network 2250 and powered on.

As the server attempts to boot from the network, the controller 2200 discovers it and provides an appropriate boot image for that server. The boot image is preferably configured to contain only the functionality required by the inventive system, including appropriately figured virtual resource manager and additional software packages, such as a virtual machine manager or a SAN management system, that are required for operation of the virtual resource manager. When the server completes its boot, the virtual resource manager establishes a network connection with the controller 2200 and registers the server as a valid virtual resource pool container. At this time, the controller 2200 learns the capabilities of the specific server and the amounts of various hardware resources available on it, such as the number and type of CPUs, the amount of memory and storage.

Whenever a new server becomes included into the inventive system, the system may decide to utilize the resources of that server for one or more of already running applications. In this case, the controller 2200 effects the migration of various virtual appliances or resources used by them onto the new server.

To remove a server from the inventive system, an administrator or external software instructs the controller 2200 to initiate a server removal procedure identifying the particular server or set of servers to be removed. Upon such action, the controller 2200 effects the migration of virtual appliances and other resources used by them from the target servers onto the remaining servers in the system. Upon successful completion of such migration, the servers targeted for removal no longer server any virtual resources to the system and can be excluded from it. The system notifies the operator or the entity that initiated the removal that it is now safe to disconnect and re-allocate or service the targeted servers.

The above server addition and removal procedures can be initiated automatically by the inventive system, controlled externally by an administrator using the user interface 2203, or initiated by external management system suitably integrated with the inventive system. Both procedures may be applied to an individual server or to an arbitrary set of servers.

Application Lifecycle

A new application is added to a running instance of the inventive system by creating it through the user interface 2203 or by importing it from another instance of the system as described below. In all cases, to make the application available to the system, the descriptor files and volume images included in or referenced by that application, are made available on storage accessible to the controller 2200. This may be disks directly attached to the controller or any suitable network storage.

As part of the process of importing or creating the application on a given instance of the inventive system, it is possible but preferably not required to further configure that particular instance of the application with hardware resources, external volumes, network addresses and tuning parameters, as may be required and provided by the application.

Figure 23:
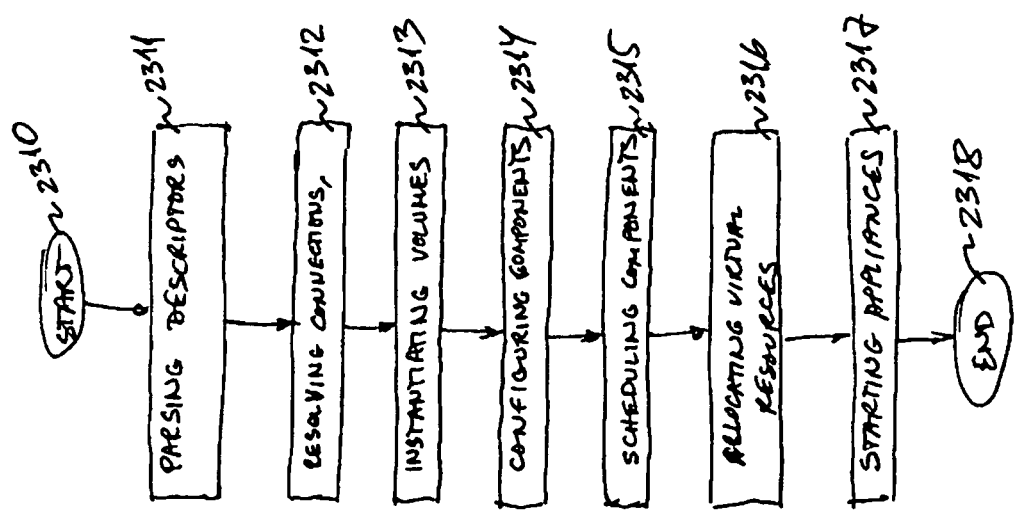
FIG. 23 illustrates the preferred logic flow for starting an application.

Once the application is made available to the running system, the system can proceed to start it. FIG. 23 illustrates the preferred process of starting an application on the inventive system.

In step 2310, an operator or external management system initiates the start of the application by interacting with the controller 2200. In step 2311, the controller parses the set of descriptors that comprise the application, preferably verifying their correctness and prepares for instantiating the application. In step 2312, the controller resolves the logical connections between terminals of the virtual appliances within the application to the degree sufficient to establish virtual connections between them at runtime. In step 2313, the controller instantiates all class volumes for all virtual appliance instances within the application. In step 2314, the controller applies the property values and other configuration parameters captured in the application's descriptors to the appropriate volume instances created in the step 2313.

In step 2315, the controller uses hardware resource constraints defined in the application, additional constraints optionally communicated to the inventive system with the application start command, as well as current runtime information about actual resources available on the system to determine how the set of virtual appliances that comprise the application is to be mapped onto the physical system.

In step 2316, the controller creates virtual machines and virtual network interfaces required to create all virtual appliance instances within the application, binds volume instances and application volumes to the respective virtual machines, binds virtual network adapters in the virtual machines to the appropriate virtual network interfaces, and creates virtual connections between virtual network interfaces, all as determined by the application descriptors.

In step 2317, the controller initiates the boot of the virtual appliances. Each virtual appliance within the application is preferably configured with a start order execution attribute. The start order attribute is preferably an ordinal value that determines the relative order of starting the particular virtual appliance instance among all instances within the application.

An instance given a particular value for the start order attribute will be started (a) only after all instances with lower values of that attribute have completed their start process, (b) in parallel with any other instance that has the same value of the start order attribute, and (c) before any other instance whose start order value is greater. Each virtual appliance is preferably configured with a software package that can report to the inventive system the moment at which the appliance has completed its start process and becomes available to the rest of the system; if a particular appliance is not configured with such software package, the inventive system may determine the readiness of the appliance externally, such as by waiting for a pre-determined amount of time, detecting CPU idle, network port activity, etc.

In step 2318, the application is fully operational and the inventive system reports this fact back to the operator or system that initiated the start procedure.

Running the Application in Steady State

In steady state, the application is executing on the inventive system. Each virtual appliance operates within a virtual machine created on one of the servers within the system. The virtual machine is configured to access the respective virtual volume instances and application volumes as if they were local on that server.

Each volume is located on one of the servers within the system; most volumes are accessed exclusively by the virtual machines of the appliances that own them and are preferably cached aggressively using available memory and/or local storage on the server on which the virtual machine of the appliance executes.

The virtual machines interact with each other by means of network packets emitted or received through their virtual network adapters and tunneled through the appropriate virtual network interfaces and virtual connections between them. The system preferably prevents any other communication between the virtual machines and reports any attempted such communication as a possible defect or security breach.

One or more virtual appliances within the application may be configured to have virtual network adapters for communicating with the outside world, including other applications running on the inventive system. Such virtual network adapters are preferably configured with IP address, network mask and other network parameters, as required to send and receive information on IP networks.

Transactional applications running on the inventive system are typically idle until they receive a service request from an external IP network. Such request enters the application through one of the publicly visible virtual network adapters. The virtual appliance that owns that adapter reacts to the request by initiating one or more interactions through its output terminals.

These requests reach other virtual appliances in accordance with the structure of the application, causing them to provide services. In the course of providing such services, some virtual appliances issue further, secondary requests through their output terminals, which end up being received by other virtual appliances in accordance with the structure of the application.

At the end, each request is terminated in one of the following two ways: (a) it is received by an ultimate "server" appliance capable of satisfying the request without generating other outgoing requests, or (b) it is received by a "gateway" appliance which is configured with sufficient information to forward the request to an external service through a virtual network adapter configured to access an external network (such as another application within the same data center, or remote application on web service accessible through the Internet). When all secondary requests complete, the application as a whole is ready to complete the initiating request that caused the activity.

Dynamic Scaling of Applications

The inventive system is preferably used in conjunction with a virtual machine manager that supports live migration of virtual machines from one server to another with minimal overhead and no disruption of the operation of the software inside the virtual machine. When used in this fashion, the inventive system supports on-demand scaling of each individual application by expanding or reducing the amount of hardware resources available to the application dynamically, while the application continues to run.

Figure 24A:
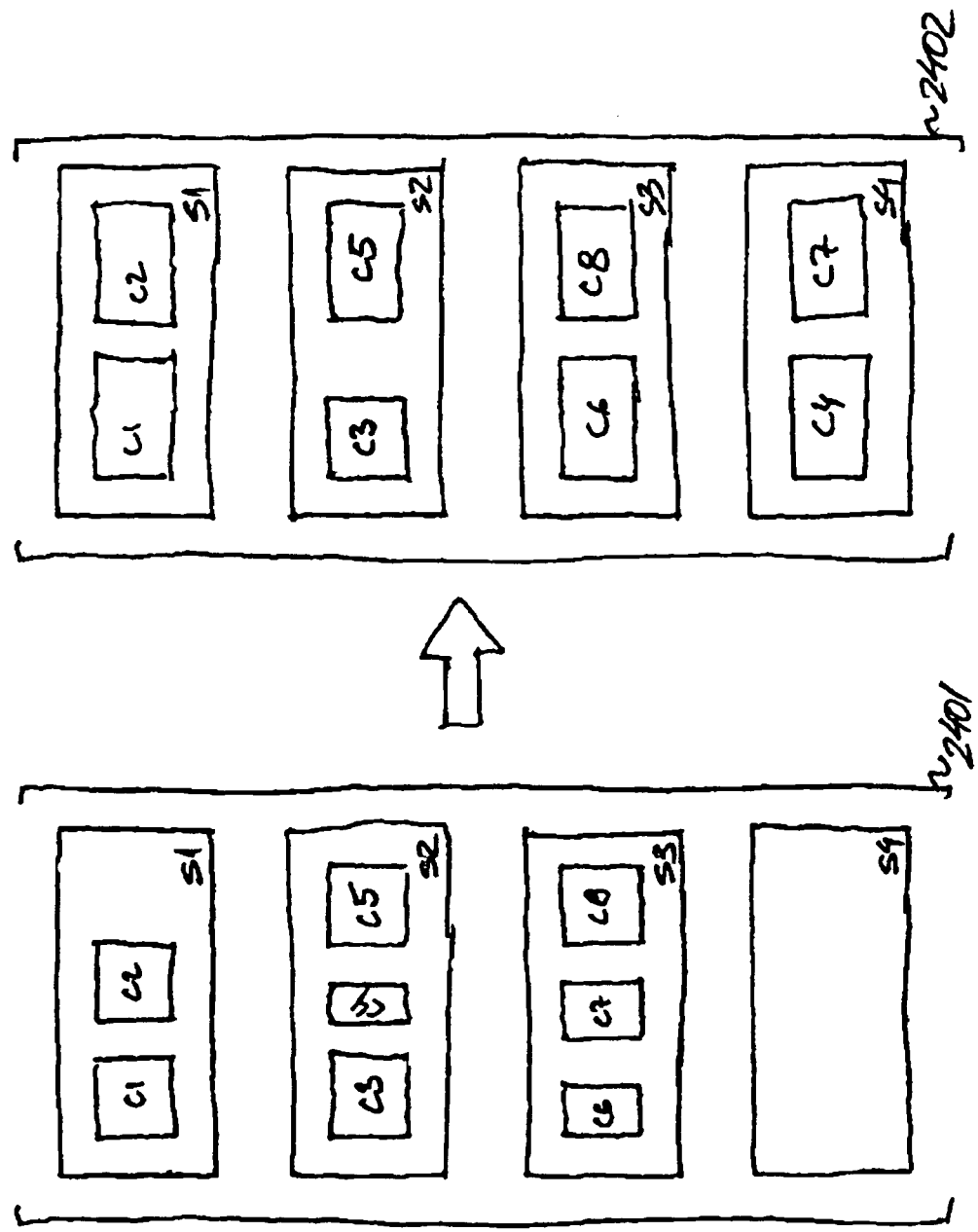
FIG. 24A illustrates the scaling up of an application.

FIG. 24A illustrates the operation of the inventive system when scaling up a running application. The system includes four servers, the servers S1, S2, S3 and S4, one of which, the server S4 has just been added to the system. The application consists of 8 virtual appliances, the appliances C1-C8. The configuration 2401 represents the state of the system prior to the scale-up process, with all virtual applications executing on only three of the servers. The virtual appliances C1 and C2 execute on server S1; virtual appliances C3, C4 and C5 execute on server S2; virtual appliances C6, C7 and C8 execute on server S3; and the server S4 is idle.

Upon initiation of the scale-up procedure, the inventive system examines the available hardware resources and the resource needs of the application, and determines how to redistribute the virtual appliances in an optimal fashion, to maximize the amount of resources available to the application. Next, the inventive system effects the migration of one or more of the virtual machines and adjusts the amount of resources available to the remaining virtual machines.

The configuration 2402 represents the end state of the scale-up process. Virtual appliances C1 and C2 continue to execute on the server S1 with the same amount of resources as they had before. The virtual appliance C4 is migrated from server S2 to server S4 and the virtual appliance C7 is migrated from server S3 to server S4; both appliances have been given more resources within their respective resource ranges. Virtual appliances C3 and C5 continue to execute on server S2; however, virtual appliance C5 is now given more hardware resources since the virtual appliance C4 no longer consumes resources on that server; while virtual appliance C3 which has already reached the maximum prescribed resource configuration continues to execute as before. Similarly, virtual appliances C6 and C8 continue to execute on server S3 with more hardware resources.

As a result, assuming all four servers are identical, the total amount of resources used by the application is increased by 33% dynamically, while the application continued to serve user requests.

Figure 24B:
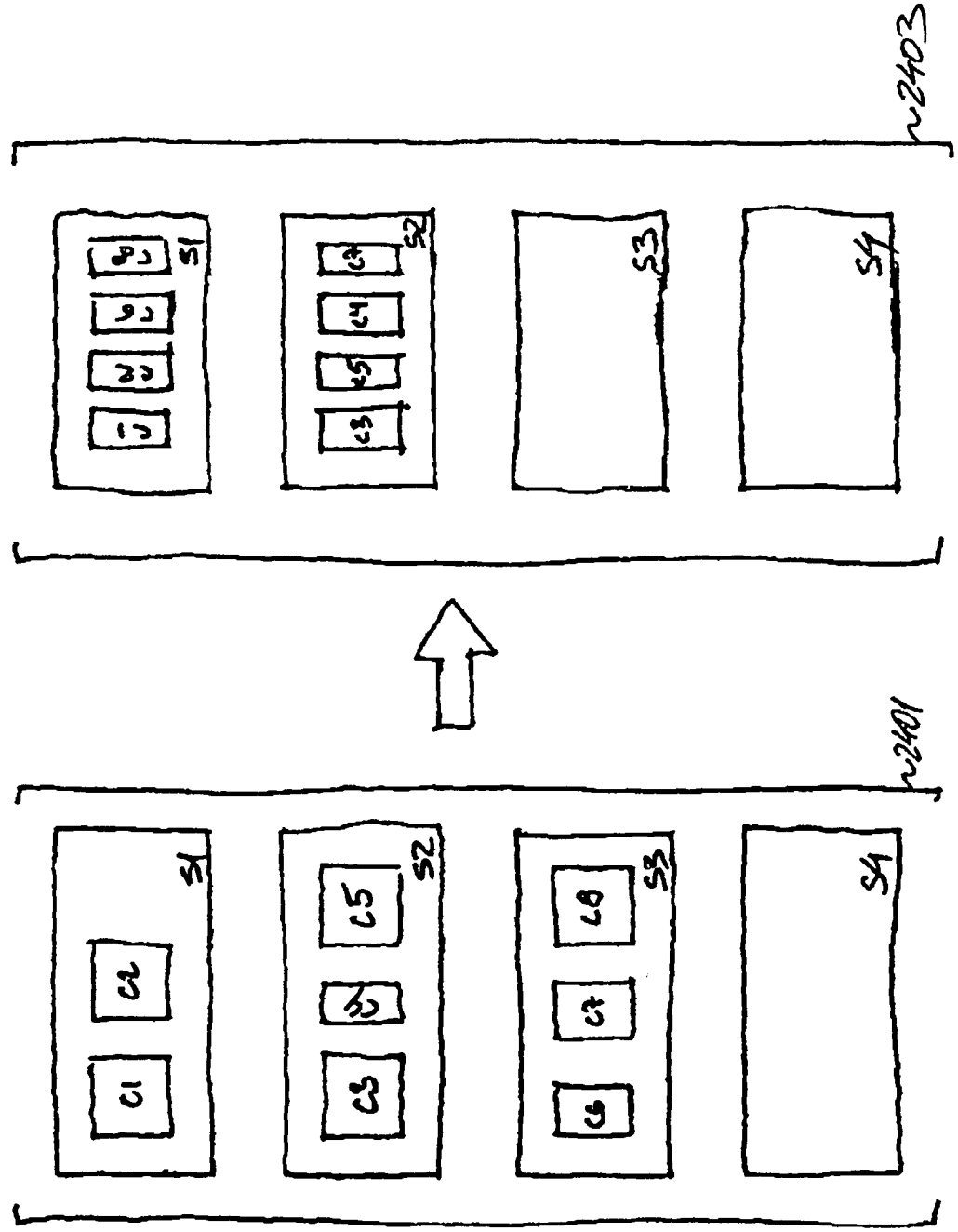
FIG. 24B illustrates the scaling down of an application.

FIG. 24B illustrates the operation of the system when scaling down a running application. The initial configuration 2401 of the system is identical to the one described above.

Upon initiation of the scale-down procedure, the inventive system examines the hardware resource limits of the virtual appliances that comprise the application and, preferably, the actual historical use of resources by each appliance, and determines the optimal way to reduce their resource allocations and migrations to achieve the scale-down configuration.

Next, the inventive system adjusts the amount of resources assigned to each virtual machine and effects the migration of one or more of the virtual machines.

The configuration 2403 represents the end state of the scale-down process. Virtual appliances C1 and C2 continue to execute on the server S1 with reduced resources. Virtual appliances C6 and C8 are migrated from server S3 to server S1; in the process, their resource budgets are adjusted. Virtual appliances C3 and C5 continue to execute on the server S2 and their resource budgets are reduced, while virtual appliance C4 which has already been assigned its minimum possible resource budget continues to execute on server S2 with the same amount of resources as before. Finally, virtual appliance C7 is migrated from server S3 to server S2 and its resource budget is adjusted.

As a result, all virtual appliances that comprise the application now execute on the servers S1 and S2. Assuming all four servers are identical, the total amount of resources used by the application is reduced by 33% dynamically, while the application continues to serve user requests, and the server S3 is now available for removal from the system or for use in another application.

While the configurations 2401, 2402 and 2403 illustrate dynamic application scaling with respect to processing, memory and bandwidth resources, it is easy to see that the exact same approach is applicable to storage resources as well. The inventive system supports the dynamic migration of virtual volumes transparently to the virtual machines that use them. Volume migration can be achieved by a variety of well-known methods, for example, by establishing a remote mirror of the desired volume on the new target server, allowing the storage software to synchronize the mirror completely, and deleting the old volume.

Running Multiple Applications

By assigning dynamically hardware resources to running applications and enforcing minimum and maximum limits on the resources consumed by each virtual appliance within an application, and therefore by the whole application, the inventive system makes it possible to share a pool of hardware resources among multiple applications.

One of the major problems in attempting to run multiple applications on shared resources with prior art systems is that the varying application loads, as well as the inability of prior art systems to constrain effectively the amount of hardware resources utilized by each application inevitably lead to situations in which an application is unable to provide desired quality of service because other applications deprive it of the resources necessary to serve requests as fast as required.

In the inventive system, as the application is constructed, each virtual appliance instance is assigned a certain minimum and maximum hardware budget. As composite appliances are constructed, the system aggregates the budgets of the subordinate instances and produces automatically a minimum and maximum budget for each composite appliance and, ultimately, for the application as a whole.

When the application is executed, the lower bound of the resource budget is treated by the inventive system as a "guaranteed performance minimum" similar to a service level agreement (SLA) in the telecommunications industry: the system will not start an application unless it can provision at least the resources required to meet the guaranteed performance minimum and will never reduce the application resources below that amount.

The upper bound of the resource budget is treated by the inventive system as a "resource quota", guaranteeing to other applications that may be executing on the same instance of the system that a particular application will never be allowed to access resources in excess to its quota and, therefore, all remaining resources will always be available to the other applications.

When multiple applications execute on the same instance of the inventive system, the hardware resources, available on the system in excess of the sum of the guaranteed performance minimums of all applications, are treated by the system as a shared resource that can be dynamically allocated and reallocated among the applications according to their needs. The system preferably keeps track of the actual resource use per application, and takes the historic data into account when determining how much resources to provide to each application.

Exporting and Importing Applications

One of the big deficiencies of prior art systems is that installing and configuring an existing distributed application on a new hardware system is a very complex and error-prone process that requires extensive modifications to the configuration of the hardware, operating systems, middleware and application, and is impossible without significant understanding of the application design as well as knowledge in multiple disciplines, including server management, IP networking, storage area networks, security, etc.

The inventive system provides a simple solution to this problem, by making it easy to export an application from one instance of the inventive system onto a storage media or network, and import it on any other instance of the inventive system that has sufficient hardware resources to run the application. The process of exporting and importing applications is preferably fully automated and requires no manual intervention and no modifications to the application itself.

Figure 25:
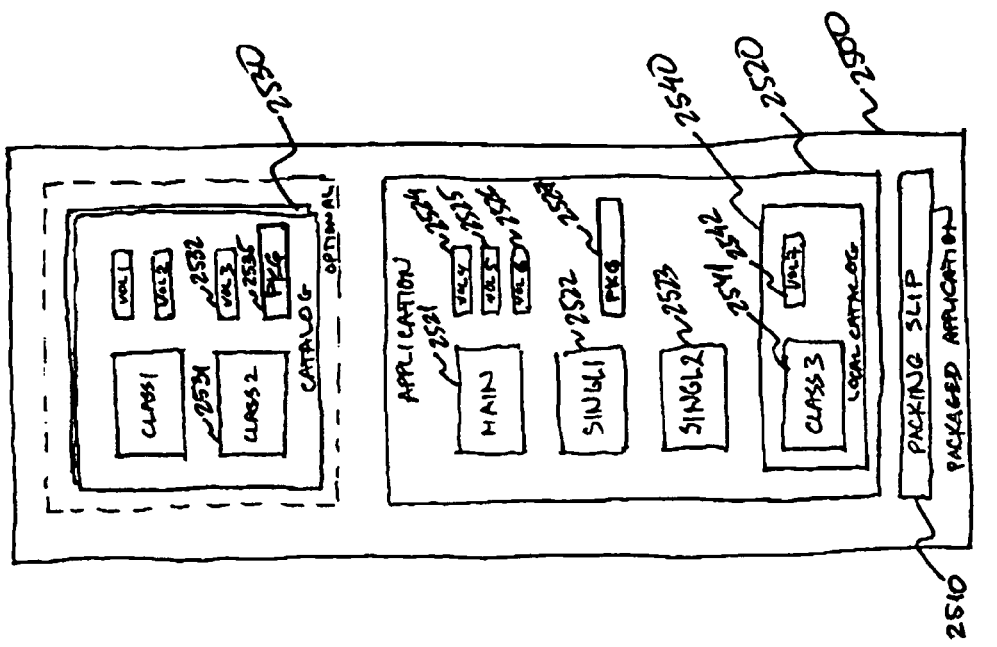
FIG. 25 illustrates the preferred structure of a packaged application.

When exporting an application, the inventive system creates an archive, preferably in the form of a single file that contains all descriptors and volumes required by the application. FIG. 25 illustrates the preferred structure of the inventive export archive. The application archive 2500 comprises a packing slip 2510, the application 2520, and, optionally, one or more catalogs 2530.

The packing slip 2510 contains the list of all entities present in the archive, preferably together with their file names, version identifiers, checksums and all other information that may be needed to administer, store and manage archives.

The application 2520 is archived as a set of files referred to by the packing slip 2510, including its package descriptor 2527, the descriptor of the main singleton 2521, additional singletons 2522 and 2523, and the local catalog of instantiable appliance classes 2540, which contains the class 2541 and the file image of its instantiable volume 2542. In addition, the application 2520 contains the file images of the application volumes 2524, 2525 and 2526.

The optional catalog 2530 contains the catalog package descriptor 2535, the class 2531 and the file image of its volume 2532.

The archive 2500 contains all configuration information, software and data required to reconstitute the application on any instance of the inventive system that has sufficient hardware resources. The archive is a conventional file or a set of files that can be stored and transported on any storage media of sufficient capacity, or can be transmitted over a network to the target system. In addition, the archive provides a convenient way to back up the entire application so that it can be reliably and quickly restored in the future.

When importing the application on another instance of the inventive system, the archive 2500 is made available to the system controller and the import procedure is initiated. The system interprets the packing slip 2510, verifies the integrity of the archive 2500 and its contents, and unpacks the archive, creating a local structure of virtual volumes and descriptor files for the application, and placing the virtual volumes in optimal locations in accordance with the application structure and available hardware resources. Upon completion of this process, the application can be started on the new system as described herein.

Considering that most of the storage used by the application is consumed by the master instances of class volumes, the inventive system preferably supports a version of the archive 2500 in which the catalogs 2530 are not included; instead the fact that they are required in order to execute the application is recorded in the packing slip 2510, together with version data and other information sufficient to uniquely and correctly identify each class referenced by the application. This has the effect of reducing the size of the archive 2500 by an order of magnitude or more for a typical application, making the application that much easier to store and transport.

Another way of practicing the inventive export and import aspects of the invention is in situations where the same application has to be deployed to a number of different locations, the hardware configurations of which are difficult to keep identical. In this case, the application is constructed and tested on one location, exported from there into an archive, and then the same archive is transmitted to each of the target locations, where it is imported into the respective local instance of the inventive system. When all such locations are managed by the same organization, the catalogs could easily be made available from all locations, which make it possible to distribute the application quickly over the network using the reduced size format.

When distributing a packaged application to multiple locations, it is preferable to design the application so that the whole application is included in a single composite appliance and its externally visible IP addresses and other configuration are expressed as properties of the appliance. This allows each instance of the application to be customized easily as appropriate for the location at which it will execute, without requiring any knowledge or understanding of the application design.

We claim:

1. A method for creating a distributed application from existing software, the method comprising the steps of:
    a) creating a plurality of storage volumes by installing software;
    b) defining a set of configurable parameters for specializing said application;
    c) visually defining metadata, using one or more processors, sufficient to automatically construct multiple running instances of said application from said volumes, each instance of said application comprising a plurality of virtual appliance instances comprising a virtual machine operable to boot an operating system, one or more virtual volumes, an application service that implements a distributed function of said application, and one or more virtual network interfaces; and
    d) defining a set of values for said configurable parameters sufficient to configure an instance of said application.

2. A method for creating a distributed application from existing software, the method comprising the steps of:
    a) selecting from a catalog a plurality of bootable volumes containing software;
    b) creating at least one application volume by installing application-specific software;
    c) defining a set of configurable parameters for specializing said application;
    d) visually defining metadata, using one or more processors, sufficient to automatically construct multiple running instances of said application from said bootable volumes and said application volume, each instance of said application comprising a plurality of virtual appliance instances comprising a virtual machine operable to boot an operating system, one or more virtual volumes, an application service that implements a distributed function of said application, and one or more virtual network interfaces; and
    e) defining a set of values for said configurable parameters sufficient to configure an instance of said application.

3. A method for creating a composite appliance from existing software, the method comprising the steps of:
    a) selecting from a catalog a plurality of bootable volumes containing software;
    b) defining a set of configurable parameters for specializing a composite appliance;
    c) visually defining metadata, using one or more processors, sufficient to automatically construct multiple running instances of said composite appliance from said bootable volumes, each instance of said composite appliance comprising a plurality of virtual appliance instances comprising a virtual machine operable to boot an operating system, one or more virtual volumes, an application service that implements a distributed function of an application, and one or more virtual network interfaces; and
    d) defining a set of values for said configurable parameters sufficient to configure an instance of said composite appliance.

4. The method of claim 1, further comprising:
    a) visually defining a subsystem of functionality of the distributed application; and
    b) configuring a particular virtual appliance instance from the plurality of virtual appliance instances to implement the subsystem of functionality.

5. The method of claim 4, wherein the particular virtual appliance instance comprises a first virtual machine and a second virtual machine, and wherein the first virtual machine is configured to pass messages to the second virtual machine to implement the subsystem of functionality.

6. The method of claim 1, further comprising:
 a) deploying an instance of said distributed application on a first hardware architecture and a second hardware architecture, wherein the first hardware architecture and the second hardware architecture are heterogeneous hardware architectures.

7. The method of claim 2, further comprising:
 a) visually defining a subsystem of functionality of the distributed application; and
 b) configuring a particular virtual appliance instance from the plurality of virtual appliance instances to implement the subsystem of functionality.

8. The method of claim 7, wherein the particular virtual appliance instance comprises a first virtual machine and a second virtual machine, and wherein the first virtual machine is configured to pass messages to the second virtual machine to implement the subsystem of functionality.

9. The method of claim 2, further comprising:
 a) deploying an instance of said distributed application on a first hardware architecture and a second hardware architecture, wherein the first hardware architecture and the second hardware architecture are heterogeneous hardware architectures.

10. The method of claim 3, further comprising:
 a) visually defining a subsystem of functionality of the application; and
 b) configuring the composite appliance to implement the subsystem of functionality.

11. The method of claim 10, wherein a particular instance of said composite appliance comprises a first virtual machine and a second virtual machine, and wherein the first virtual machine is configured to pass messages to the second virtual machine to implement the subsystem of functionality.

12. The method of claim 3, further comprising:
 a) deploying a particular instance of said composite appliance on a first hardware architecture and a second hardware architecture, wherein the first hardware architecture and the second hardware architecture are heterogeneous hardware architectures.

\* \* \* \* \*